(12) United States Patent　(10) Patent No.: US 10,230,861 B2
Fujioka　(45) Date of Patent: *Mar. 12, 2019

(54) DEVICE MANAGEMENT SYSTEM, DEVICE MANAGEMENT APPARATUS, AND DEVICE MANAGEMENT METHOD

(71) Applicant: Susumu Fujioka, Kanagawa (JP)

(72) Inventor: Susumu Fujioka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/887,294

(22) Filed: Feb. 2, 2018

(65) Prior Publication Data

US 2018/0159998 A1　Jun. 7, 2018

Related U.S. Application Data

(63) Continuation of application No. 14/845,485, filed on Sep. 4, 2015, now Pat. No. 9,924,056.

(30) Foreign Application Priority Data

Sep. 9, 2014　(JP) ................................ 2014-182904

(51) Int. Cl.
*G06F 3/12*　(2006.01)
*H04N 1/00*　(2006.01)
*H04N 1/44*　(2006.01)

(52) U.S. Cl.
CPC ....... *H04N 1/00854* (2013.01); *G06F 3/1222* (2013.01); *G06F 3/1238* (2013.01);
(Continued)

(58) Field of Classification Search
None
See application file for complete search history.

(56) References Cited

U.S. PATENT DOCUMENTS

2006/0095566 A1　5/2006　Kanai
2012/0300242 A1　11/2012　Meike et al.
(Continued)

FOREIGN PATENT DOCUMENTS

EP　　1976189 A2　10/2008
JP　2005-284985 A　10/2005
(Continued)

*Primary Examiner* — Fan Zhang
(74) *Attorney, Agent, or Firm* — Harness, Dickey & Pierce, P.L.C.

(57) ABSTRACT

A device management system includes a device management apparatus, a first electronic device, a second electronic device, and an intervening apparatus. The device management apparatus includes a memory storing authorized user identification information, a receiver receiving user identification information from the first electronic device, and processing circuitry determining whether it is allowed to use at least the first electronic device. If so, third device identification information is stored. The intervening apparatus includes a receiver receiving the user identification information from the second electronic device and processing circuitry determining whether it is allowed to use at least the first electronic device. If so, the third device identification information is received. The second electronic device includes a receiver receiving a request and processing circuitry determining whether the third device identification information in the request matches the third device identification information received from the device management apparatus, and accepts the request.

8 Claims, 15 Drawing Sheets

(52) U.S. Cl.
CPC ....... *G06F 3/1287* (2013.01); *H04N 1/00244* (2013.01); *H04N 1/00344* (2013.01); *H04N 1/4413* (2013.01); *H04N 2201/0081* (2013.01); *H04N 2201/0082* (2013.01); *H04N 2201/0091* (2013.01); *H04N 2201/0094* (2013.01)

(56) References Cited

U.S. PATENT DOCUMENTS

| | | |
|---|---|---|
| 2013/0027746 A1 | 1/2013 | Sasase |
| 2013/0314748 A1 | 11/2013 | Okigami et al. |
| 2015/0002879 A1 | 1/2015 | Naruse |
| 2015/0193674 A1 | 7/2015 | Ishiguro |
| 2015/0234623 A1 | 8/2015 | Mochizuki |
| 2015/0317108 A1 | 11/2015 | Hadano et al. |

FOREIGN PATENT DOCUMENTS

| | | |
|---|---|---|
| JP | 2007-243562 A | 9/2007 |
| JP | 2012-230611 A | 11/2012 |
| KR | 20110127565 A | 11/2011 |
| KR | 20110127566 A | 11/2011 |

CONFIGURATION CONFIRMATION SCREEN G2

DEVICE MANAGEMENT SYSTEM, DEVICE MANAGEMENT APPARATUS, AND DEVICE MANAGEMENT METHOD

CROSS-REFERENCE TO RELATED APPLICATION

This is a continuation of patent application Ser. No. 14/845,485, filed Sep. 4, 2015, and claims priority pursuant to 35 U.S.C. § 119(a) to Japanese Patent Application No. 2014-182904, filed on Sep. 9, 2014 in the Japan Patent Office, the entire disclosure of which is hereby incorporated by reference herein.

BACKGROUND

Technical Field

The present invention relates to a device management system, a device management apparatus, and a device management method.

Background Art

Along with development of communication lines, it is now common to utilize image processing apparatuses connected to networks, such as multifunction peripherals, copiers, scanners, and printers, from multiple information processing apparatuses connected to the networks such as computers.

In network systems, especially managed network systems in which security is a concern, authentication servers are connected to the networks. The authentication server registers image processing apparatuses associated with user authentication data (e.g., user IDs) that specifies which users are allowed to utilize which image processing apparatus in the network in nonvolatile memories. In the network systems, in case of user input of user authentication data in the image processing apparatus the image processing apparatus transfers the user authentication data and its own device identification information to the authentication server to request authentication. Based on the received user authentication data and the device identification information, the authentication server determines whether or not the image processing apparatus is available to the user and transfers the determination result to the image processing apparatus. The image processing apparatus controls whether or not it is available to the user in accordance with the determination result from the authentication server.

In addition, along with the development of communication lines, public facilities such as telework facilities that include multiple image processing apparatuses connected to networks such as the Internet available for users are now widely used. In the telework facilities, the image processing apparatuses are available on a pay-per-use basis.

Furthermore, recently, mobile devices such as smartphones and tablets have become popular, and it is vital to be able to exchange data between the mobile devices and the image processing apparatuses and use the image processing apparatus from the mobile devices.

However, unfettered access to image processing apparatuses in the public facilities from mobile devices poses unique data-security challenges.

SUMMARY

Embodiments of the present invention provide a novel device management system that includes a device management apparatus, a first electronic device, a second electronic device, and an intervening apparatus. The device management apparatus includes a memory that stores authorized user identification information indicating who is allowed to use at least the first electronic device and the second electronic device, a receiver that receives user identification information of a user from the first electronic device, and processing circuitry that determines whether the user is allowed to use at least the first electronic device using the user identification information, and when the user is allowed to use, further stores third device identification information of a third electronic device carried by the user and device type information indicating a device type of the first electronic device that are received from the first electronic device in association with the user identification information of the user in the memory. The intervening apparatus includes a receiver that receives the user identification information of the user from the second electronic device and processing circuitry that determines whether the user is allowed to use at least the first electronic device using the user identification information, and, when the user is allowed to use, receives from the device management apparatus the third device identification information stored in association with the user identification information of the user. The second electronic device includes a receiver that receives a request for communicating from the third electronic device carried by the user and processing circuitry that determines whether the third device identification information included in the request for communicating matches the third device identification information received from the device management apparatus via the intervening apparatus, and accepts the request for communicating when the third device identification information match.

Further embodiments of the present invention provide a device management apparatus and a device management method.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

DETAILED DESCRIPTION

Figure 1:
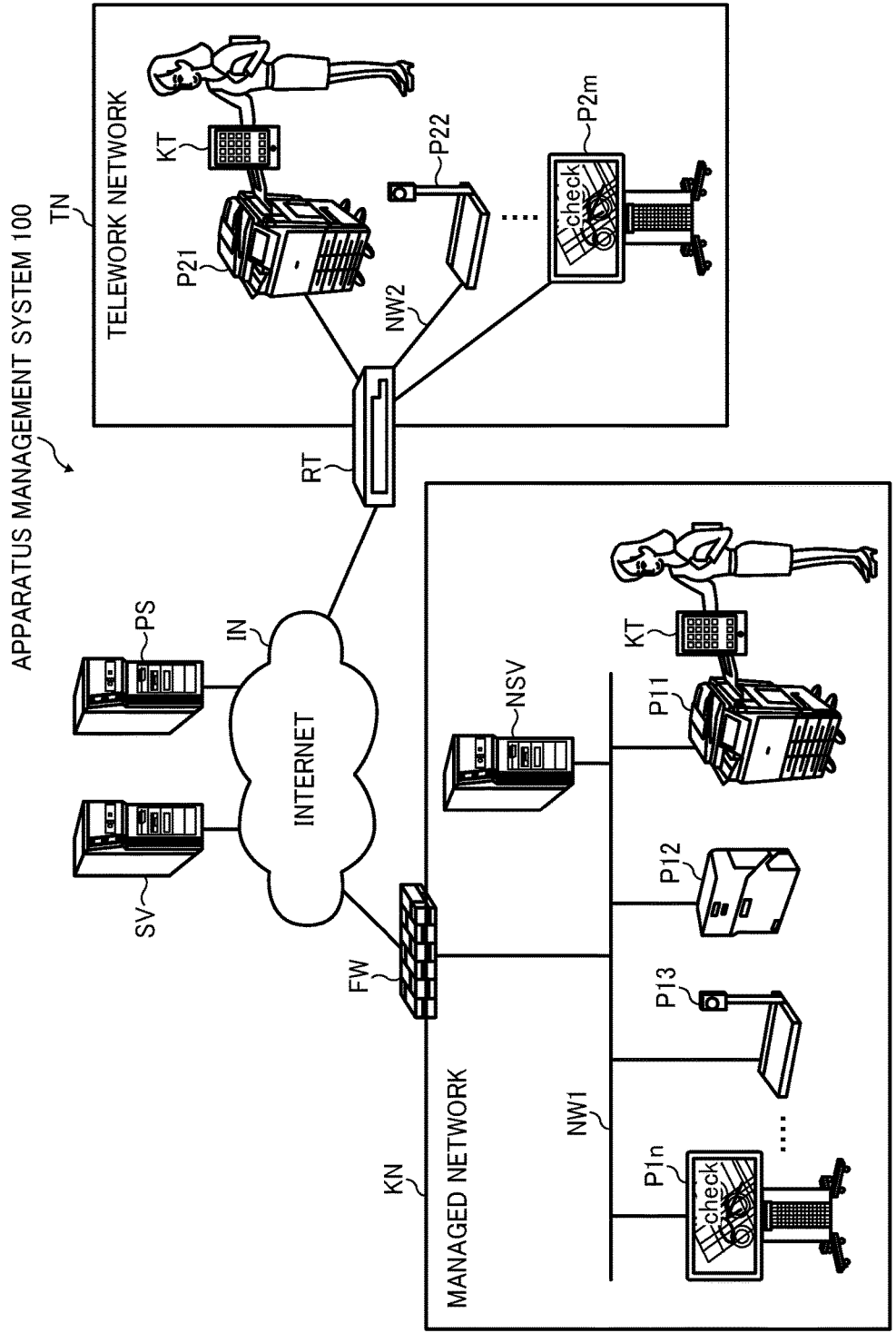
FIG. 1 is a diagram illustrating a device management system as a first embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

First Embodiment

A device management system and a device management method in a first embodiment of the present invention are described below with reference to FIGS. 1 to 13.

FIG. 1 is a diagram illustrating a configuration of a device management system 100 in this embodiment. In FIG. 1, in the device management system 100, a device management server SV, a cloud portal server PS, a managed network KN, and a telework network TN are connected to the Internet IN.

The managed network KN is installed in offices, etc. In the managed network KN, a firewall FW, an authentication server NSV, and multiple image processing apparatuses (first electronic devices) P11 to P1n are connected to a network NW1 such as a Local Area Network (LAN) and a Wide Area Network (WAN).

Examples of the image processing apparatuses P11 to P1n are a multifunction peripheral (MFP) P11, a projector P12, a videoconference terminal P13, an electronic whiteboard P1n, a facsimile machine, a copier, a printer, and a scanner etc. (not shown in figures). The MFP P11 includes multiple functions such as scan, print, copy, and facsimile etc. The projector P12 projects screen data input from computers etc. via a video cable and the network NW1 on a screen. The videoconference terminal P13 includes devices such as a camera, a microphone, and a speaker etc. and communicates with a remote videoconference terminal to hold a videoconference.

In the managed network KN, a wireless access point device (not shown in figures) is connected to the network NW1, and the wireless access point device communicates with mobile devices (third electronic devices) such as tablets and smartphones wirelessly.

The wireless access point device includes a memory to store device identification information to identify a mobile device KT allowed to communicate to ensure security of the managed network KN and data. For example, an Electrically Erasable and Programmable ROM (EEPROM) is used for the memory. A serial number and MAC address of a wireless communication adapter in the mobile device KT can be used as the device identification information for example. The device identification information is hereinafter referred to as "device ID".

Computers etc. with a generic hardware configuration and software configuration are used for the authentication server NSV. Especially, the authentication server NSV includes software to implement an authentication process. In the authentication server NSV, an authentication information database to authenticate a user who is allowed to use the image processing apparatuses P11 to P1n in the managed network KN is stored in a nonvolatile memory (information storage unit) such as hardware.

In the authentication information database, each user identification information of a user who is allowed to use the image processing apparatuses P11 to P1n is registered associated with user password, device identification information, and type identification information. The user identification information is information for identifying users and referred to as "user ID" hereinafter. In addition, the device identification information is information for identifying the image processing apparatuses P11 to P1n and referred to as "device ID" hereinafter. The type identification information is information for identifying types (models) of the image processing apparatuses P11 to P1n and referred to as "type ID" hereinafter. In addition, the user ID and password are used for user authentication and referred to as user information or user identification information appropriately.

After receiving the user information (user ID and password), device ID, and type ID from the image processing apparatuses P11 to P1n along with a request for authentication, the authentication server NSV searches through the authentication information database based on the user ID and the device ID. If the user ID is not registered in the authentication information database, the authentication server NSV rejects the authentication. If the user ID is registered and the device ID is not registered, the authentication server NSV rejects the authentication. That is, if the user ID requested for the authentication is registered in the authentication information database and the device ID is registered corresponding to the user ID, the authentication server NSV allows the authentication. It is possible that the authentication server NSV performs simple user authentication determining whether or not the user ID and password are registered in the nonvolatile memory.

In processing the request for authentication, in case of allowing use while the information is not registered in the authentication information database, the authentication server NSV registers the password, device ID, and type ID in the authentication information database associating with the user ID in the authentication request.

That is, the authentication server NSV includes a nonvolatile memory (information storage unit) to store user identification information (user information, i.e., user ID and password) of a user who is allowed to use the image processing apparatuses P11 to P1n as the first electronic devices. In addition, the authentication server NSV includes a user applicability determination unit that determines whether or not the user identification information is applicable referring to the nonvolatile memory based on the user identification information after the user identification information is transferred by the image processing apparatuses P11 to P1n and it is inquired whether or not the user identification information is applicable. Furthermore, the authentication server NSV includes a user applicability response unit that transfers response information indicating that the user identification information is applicable to the image processing apparatuses P11 to P1n if the user applicability determination unit determines that the user identification information is applicable.

Figure 2:
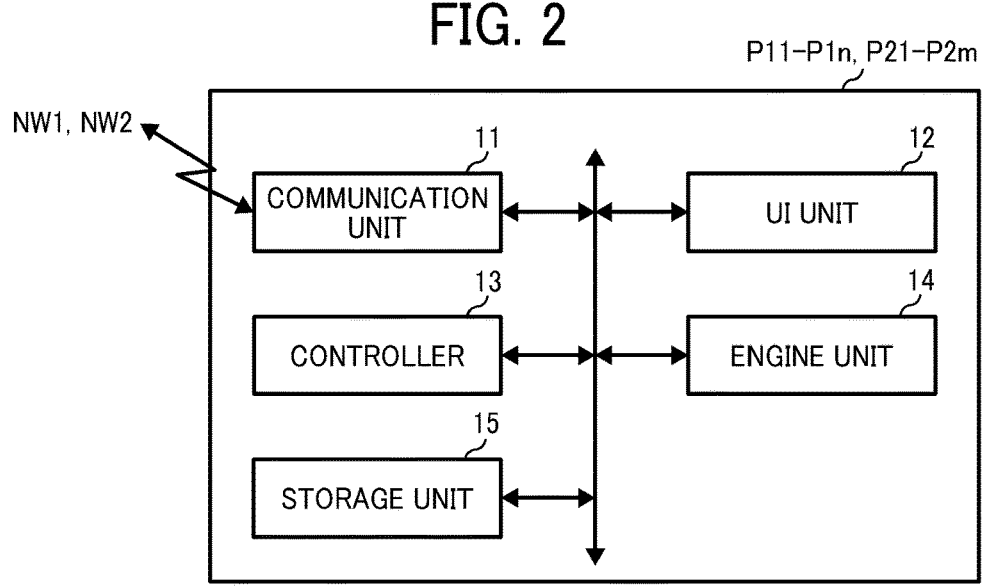
FIG. 2 is a diagram illustrating functional blocks of an image processing apparatus in the first embodiment of the present invention.

The image processing apparatuses P11 to P1n include hardware configurations and software configurations in accordance with their device types. As shown in FIG. 2, the image processing apparatuses P11 to P1n include a communication unit 11, a user interface (UI) unit 12, a controller 13, an engine unit 14, and a storage unit 15 etc. as their hardware configurations.

The communication unit 11 is connected to the network NW1, and the communication unit 11 communicates with other image processing apparatuses P11 to P1n, the authentication server NSV, and devices outside of the managed network KN via the firewall FW under the control of the controller 13.

The UI unit 12 includes various keys, buttons, and a display unit etc. On the UI unit 12, commands to have the image processing apparatuses P11 to P1n perform various operations are input using the keys and buttons, and the input operation content is output to the controller 13. The UI unit 12 displays display data that the controller 13 transfers on the display. The UI unit 12 is used for inputting user ID and password by user operation. While the user ID and password can be input using the keys etc., it is possible to include an Integrated Circuit (IC) card reader and scan an authentication card in which the user ID and password are stored using the IC card reader.

The controller 13 includes a central processing unit (CPU), a read-only memory (ROM), and a random-access memory (RAM) etc. In the controller 13, a device management program that the image processing apparatuses P11 to P1n execute and desired system data etc. are stored in the ROM among operating systems for the image processing apparatuses P11 to P1n and device management programs in this embodiment. The controller 13 controls the entire image processing apparatuses P11 to P1n using the RAM as a work memory based on the program stored in the ROM by the CPU and performs fundamental processes as the image processing apparatuses P11 to P1n. The controller 13 performs a device management method that the image processing apparatuses P11 to P1n execute by the CPU among device management methods in this embodiment base on the device management program stored in the ROM.

The engine unit 14 performs various functions that the image processing apparatuses P11 to P1n include. For example, in case of the MFP P11, the engine unit 14 corresponds to a print unit that forms an image and a scan unit that scans an image on a document. In addition, in case of the projector P12, the engine unit 14 corresponds to a projection unit that projects an image on a screen, a microphone, and a speaker etc. Furthermore, in case of the videoconference terminal P13, the engine unit 14 corresponds to a video capture unit that captures conference attendees, a projection unit that projects remote attendees, a microphone, and a speaker etc. In case of the electronic whiteboard P1n, the engine unit 14 corresponds to a capture unit that captures an image drawn on the whiteboard and an output unit that outputs an image on the whiteboard etc.

The storage unit 15 is a nonvolatile memory device. In the storage unit 15, various data such as image data etc. desired for operations of the image processing apparatuses P11 to P1n are stored and stored image data etc. read under the control of the controller 13. Especially, in the storage unit 15, the device ID of the mobile device KT connected via the network NW1 and allowed to use is stored as a list of the device IDs and the stored device IDs are read under the control of the controller 13. Furthermore, in the storage unit 15, configuration information set when a user uses functions in the past is stored as a configuration information database associated with the user's user ID and the stored configuration information is read under the control of the controller 13.

In the image processing apparatuses P11 to P1n, the device ID (device identification information) for specifying the device and the type ID (model identification information) for specifying the device type (e.g., MFPs and electronic whiteboards etc.) are stored in the ROM of the controller 13 or the storage unit 15. Subsequently, after inputting the user ID and password on the UI unit 12 and receiving the identification request (usage request), the controller 13 requests the authentication server NSV to authenticate the user transferring the user ID, password, device ID, and type ID to the authentication server NSV.

After receiving result information indicating that the user ID is appropriate from the authentication server NSV, the controller 13 allows use of the image processing apparatuses P11 to P1n by user operation.

In the image processing apparatuses P11 to P1n, after the communication unit 11 receives the device ID (third device identification information) and the usage request from the mobile device KT via the network NW1, the controller 13 searches through the device ID list stored in the storage unit 15 based on the device ID. If the device ID transferred along with the usage request is registered in the device ID list, the controller 13 requests the communication unit 11 to transfer the usage allowance and its own type ID to the mobile device KT.

After receiving the usage allowance and the type ID, the mobile device KT displays a usage screen of the image processing apparatuses P11 to P1n in accordance with the type ID. For example, if the type ID indicates the type of the MFP P11, the mobile device KT displays a screen for selecting functions that the MFP P11 includes etc. After a function to be used (e.g., scan function) is selected on the usage screen, the mobile device KT notifies the image processing apparatuses P11 to P1n of the selected function wirelessly via the network NW1.

In the image processing apparatuses P11 to P1n, after receiving the function notice from the mobile device KT, the controller 13 checks whether or not the configuration information of the selected function is registered in the configuration information database stored in the storage unit 15 in accordance with the device ID of the mobile device KT. If the configuration information of the selected function is registered in the configuration information database, the controller 13 transfers the configuration information to the mobile device KT. If the configuration information of the selected function is not registered in the configuration information database, the controller 13 notifies the mobile device KT that the configuration information is not registered.

Figure 3:
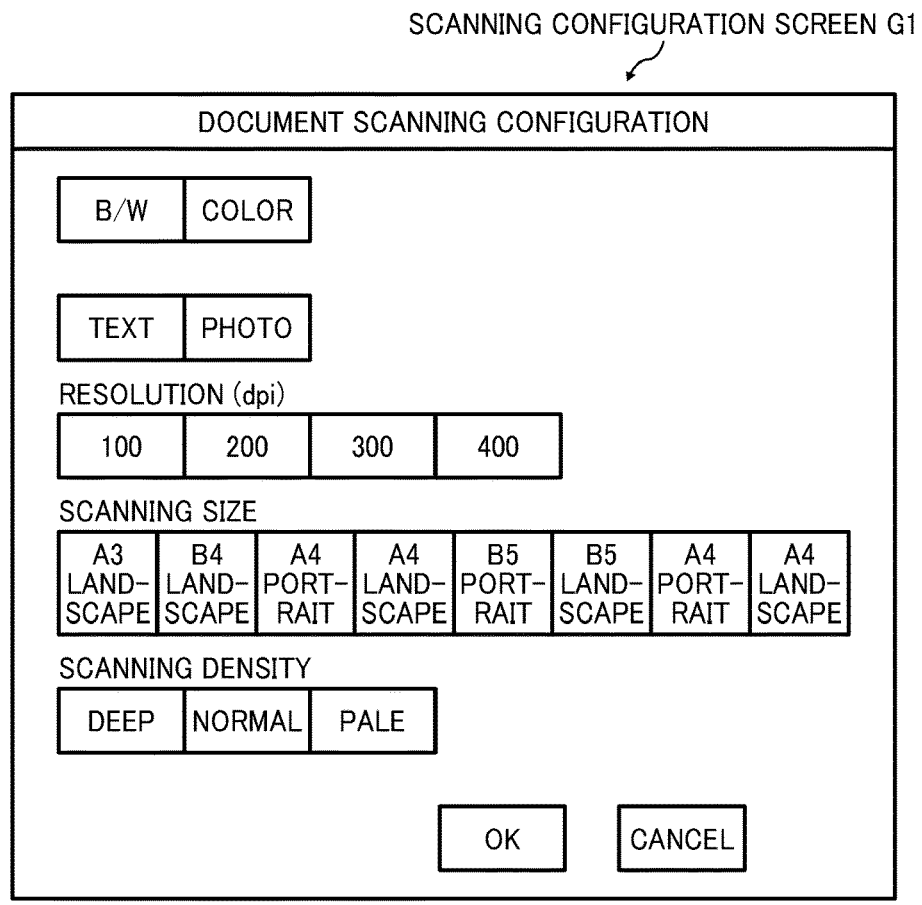
FIG. 3 is a diagram illustrating a setting screen for scanning in the first embodiment of the present invention.

After receiving the configuration information from the image processing apparatuses P11 to P1n, the mobile device KT displays the received configuration information on the display as a configuration confirmation screen. In case of receiving the notification that the configuration information is not registered, the mobile device KT displays a configuration screen on the display. For example, in case of the scan function, the configuration screen G1 in FIG. 3 is displayed as the configuration screen indicating colors, image types, resolution, scanning sizes, scanning densities, a OK button, and a Cancel button etc.

Figure 4:
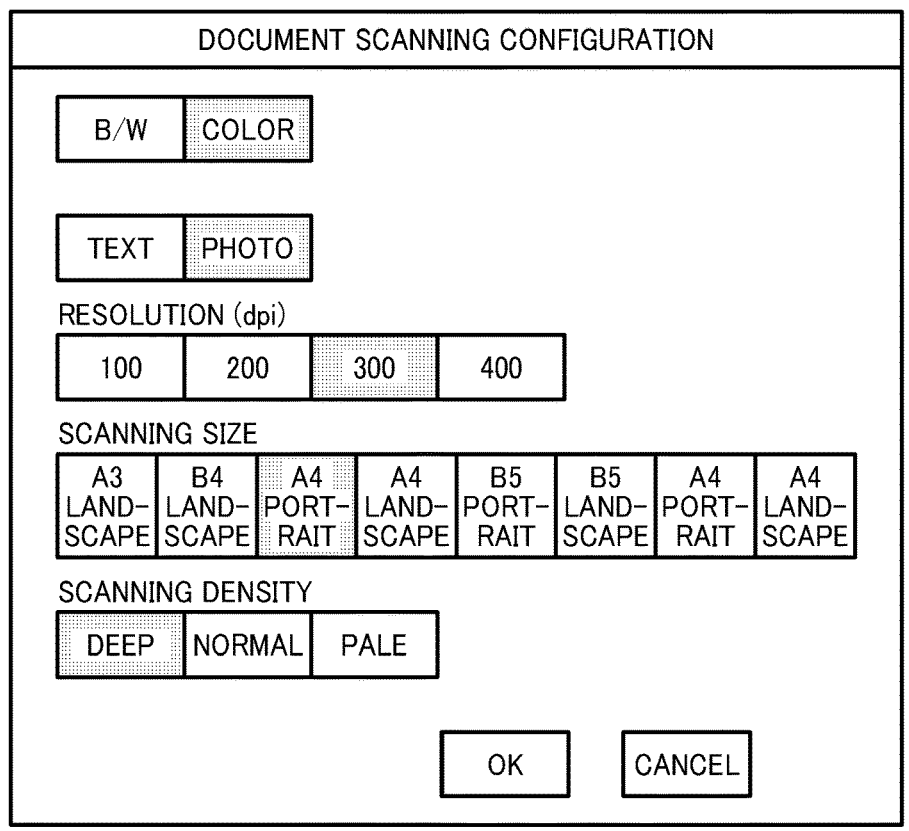
FIG. 4 is a diagram illustrating a confirmation screen for scanning in the first embodiment of the present invention.

In addition, for example, in case of the scan function, the configuration confirmation screen G2 in FIG. 4 is displayed as the configuration confirmation screen. On the configuration confirmation screen G2, selected items are displayed distinguishably based on the configuration screen G1 with reference to the configuration information. For example, in FIG. 4, "color" is selected for colors, "photo" is selected for image types, "300 dpi" is selected for resolution, "A4 portrait" is selected for scanning sizes, and "deep" is selected for scanning densities.

The mobile device KT includes the touch-screen display, and various items can be configured on the configuration screen G1 by being pressed. On the configuration confirmation screen G2, if an item different from the item already selected is pressed, the mobile device KT modifies the configuration.

If the OK button is pressed on the configuration screen G1 or the configuration confirmation screen G2, the mobile device KT transfers the selected items as the configuration information to the image processing apparatuses P11 to P1n.

After receiving the configuration information from the mobile device KT, in the image processing apparatuses P11 to P1n, the controller 13 registers the configuration information in the configuration information database in the storage unit 15 associating the configuration information with the user ID. In this case, if the configuration information has been already registered corresponding to the user ID, the controller 13 checks whether or not the configuration information is the same. If the configuration information is the same, the configuration information is not registered. If the configuration information is not the same, the configuration information is registered additionally.

After registering the configuration information corresponding to the user in the configuration information database, the image processing apparatuses P11 to P1n transfer the user ID and password corresponding to the user to the device management server SV to request the user authentication. After the device management server SV authenticates the user, the image processing apparatuses P11 to P1n transfers the configuration information corresponding to the user along with the device ID of the mobile device KT and the type ID of the image processing apparatuses P11 to P1n to request to register the configuration information.

As described later in detail, the device management server SV registers the configuration information, the type ID of the image processing apparatuses P11 to P1n, and the device ID of the mobile device KT associating with the user ID in response to the configuration information registration request.

Figure 5:
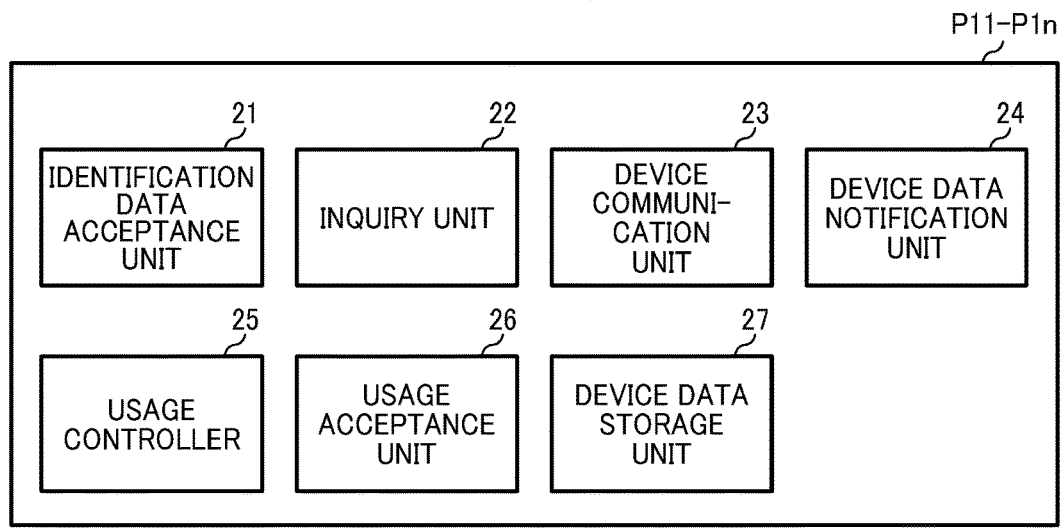
FIG. 5 is a diagram illustrating functional blocks of the image processing apparatus in a managed network as the first embodiment of the present invention.

That is, in the image processing apparatuses P11 to P1n, functional blocks in FIG. 5 are implemented by installing a device management program executed by the image processing apparatuses P11 to P1n among the device management programs in this embodiment. In other words, in the image processing apparatuses P11 to P1n, an identification information acceptance unit 21, an inquiry unit 22, a device communication unit 23, a device data notification unit 24, a usage controller 25, a usage acceptance unit 26, and a device data storage unit 27 are implemented by installing the device management program described above.

The identification information acceptance unit (user identification information acceptance unit) 21 is implemented by the UI unit 12 and accepts the user identification information such as the user ID and password.

The inquiry unit 22 is implemented by the controller 13 and the communication unit 11 and transfers the user ID and password that the identification information acceptance unit 21 accepts to the authentication server NSV to request the authentication (inquiring whether or not the user identification information is appropriate).

The device communication unit 23 is implemented by the communication unit 11 to communicate with the mobile device KT via the network NW1 and the wireless access point device.

The usage acceptance unit (communication acceptance unit) 26 is implemented by the controller 13 and accepts the usage request notified along with the device ID by the mobile device KT via the device communication unit 23.

The device information storage unit 27 is implemented by the storage unit 15 and prestores device IDs of the mobile devices KT allowed to use the image processing apparatuses P11 to P1n. In addition, the device information storage unit 27 stores the configuration information of functions included in the image processing apparatuses P11 to P1n that used the device ID associating with the device ID.

The usage controller (communication control unit) 25 is implemented by the controller 13. If the response to the inquiry by the inquiry unit 22 indicates that the user identification is appropriate, the usage controller 25 searches through the device information storage unit 27 based on the device ID that the usage acceptance unit 26 accepts to determine whether or not the mobile device KT with the device ID is appropriate. If the device ID that the usage acceptance unit 26 accepts is registered in the device information storage unit 27, the usage controller 25 allows the user who uses the mobile device KT with the device ID to use the image processing apparatuses P11 to P1n. If the user authentication is appropriate and the device ID is not registered in the device information storage unit 27, the usage controller 25 either does not allow the mobile device KT to use the image processing apparatuses P11 to P1n or limits the usable functions. In this case, it is possible to allow use of the image processing apparatuses P11 to P1n by user operation manually on the image processing apparatuses P11 to P1n. An example of limiting functions is that it is allowed to operate the image processing apparatuses P11 to P1n using the mobile device KT and it is prohibited to download data to the mobile device KT. After the function in the image processing apparatuses P11 to P1n is configured using the mobile device by allowed user operation, the usage controller 25 stores the configuration information in a temporary folder in the device information storage unit 27 associated with the device ID of the mobile device KT.

The device information notification unit (information transmitter) 24 is implemented by the communication unit 11 and the controller 13. After the usage controller 25 allows to operate the image processing apparatuses P11 to P1n using the mobile device KT, the device information notification unit 24 transfers the user information (user ID and password), the device ID of the mobile device KT stored in the device information storage unit 27, its own type ID, and the configuration information for functions to the device management server SV.

The firewall FW connects the network NW1 to the Internet IN and allows the image processing apparatuses P11 to P1n connected to the network NW1 to connect to (communicate with) devices connected to the Internet IN. By contrast, the firewall FW does not allow devices connected to the Internet IN to connect to the image processing apparatuses P11 to P1n directly except for the videoconference terminal P13 connected to the network NW1. The firewall FW opens a port for videoconferencing (e.g., 60000) so that a device (such as a videoconference terminal) connected to the Internet IN can connect to the videoconference terminal P13 by setting its destination port number at 60000.

The telework network TN is included in the telework facility. In the telework network TN, a router RT and multiple image processing apparatuses (second electronic devices) P21 to P2m are connected to a network NW2 such as the LAN etc. Examples of the image processing apparatuses P21 to P2m are the MFP P21, the videoconference terminal P22, and the electronic whiteboard P2m etc.

In the telework network TN, a wireless access point device (not shown in figures) is connected to the network NW2, and the wireless access point device communicates with mobile devices KT such as tablets and smartphones wirelessly.

The router RT connects the network NW2 to the Internet IN.

Basically, the hardware configuration and software configuration of the image processing apparatuses P21 to P2m are similar to the image processing apparatuses P11 to P1n in the managed network KN, and their hardware configuration is similar to the hardware configuration in FIG. 2. Therefore, in the description of the image processing apparatuses P21 to P2m, numbers used in the hardware configuration of the image processing apparatuses P11 to P1n shown in FIG. 2 are used accordingly.

Figure 6:
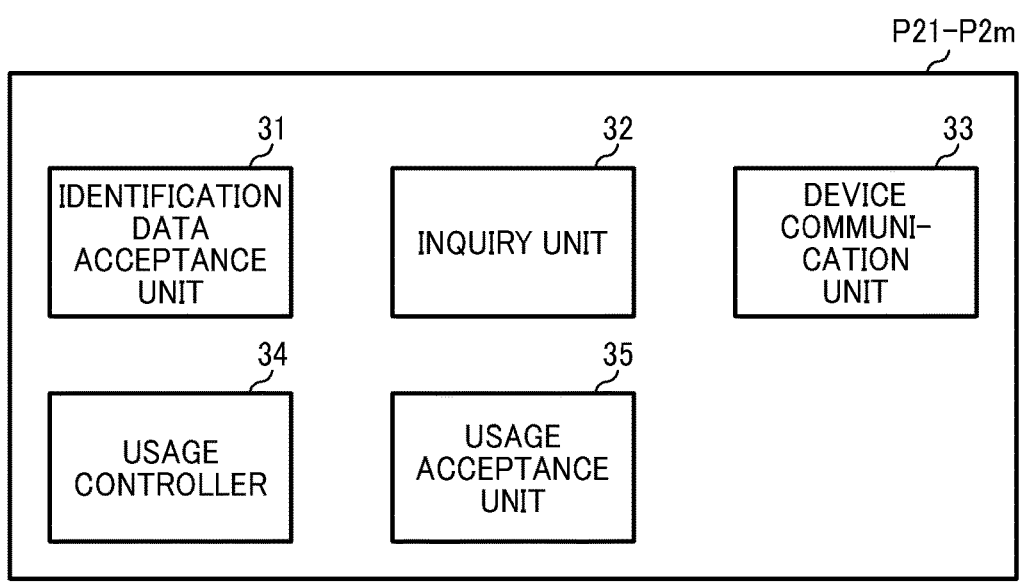
FIG. 6 is a diagram illustrating functional blocks of the image processing apparatus in a telework network as the first embodiment of the present invention.

In the image processing apparatuses P21 to P2m, functional blocks in FIG. 6 are implemented by installing a device management program executed by the second electronic device among the device management programs in this embodiment. That is, in the image processing apparatuses P21 to P2m, an identification information acceptance unit 31, an inquiry unit 32, a device communication unit 33, a usage controller 34, and a usage acceptance unit 35 are implemented by installing the device management program.

The identification information acceptance unit (user identification information acceptance unit) 31 is implemented by the UI unit 12 in the image processing apparatuses P21 to P2m and accepts the user identification information such as the user ID and password.

The inquiry unit 32 is implemented by the controller 13 and the communication unit 11 in the image processing apparatuses P21 to P2m and transfers the user ID and password that the identification information acceptance unit 31 accepts to the device management server SV to request the authentication (inquiring whether or not the user identification information is appropriate). If the authentication result indicates that the authentication succeeded, the inquiry unit 32 transfers its own type ID and a configuration information acquisition command to the device management server SV to request the configuration information.

The device communication unit 33 is implemented by the communication unit 11 in the image processing apparatuses P21 to P2m to communicate with the mobile device KT via the network NW2 and the wireless access point device.

The usage acceptance unit (communication acceptance unit) 35 is implemented by the controller 13 in the image processing apparatuses P21 to P2m and accepts the usage request notified along with the device ID by the mobile device KT via the device communication unit 33.

The usage controller (communication control unit) 34 is implemented by the controller 13 in the image processing apparatuses P21 to P2m. If the response by the device management server SV to the inquiry by the inquiry unit 32 indicates that the user identification is appropriate, the usage controller 34 determines whether or not the mobile device KT with the device ID is appropriate by determining whether or not the transferred device ID along with the response matches the device ID that the usage acceptance unit 35 accepts. If the device ID that the usage acceptance unit 35 accepts matches the device ID transferred by the device ID, the usage controller 34 determines that the mobile device KT is appropriate and allows use of the image processing apparatuses P21 to P2m via the mobile device with the device ID by user operation. If the device ID does not match, the usage controller 34 does not allow use of the image processing apparatuses P21 to P2m via the mobile device or limits the usable functions. However, the usage controller 34 allows use of the image processing apparatuses P21 to P2m by user operation. An example of limiting functions is that it is allowed to use the image processing apparatuses P21 to P2m via the mobile device KT by user operation and it is prohibited to download data to the mobile device KT.

Figure 7:
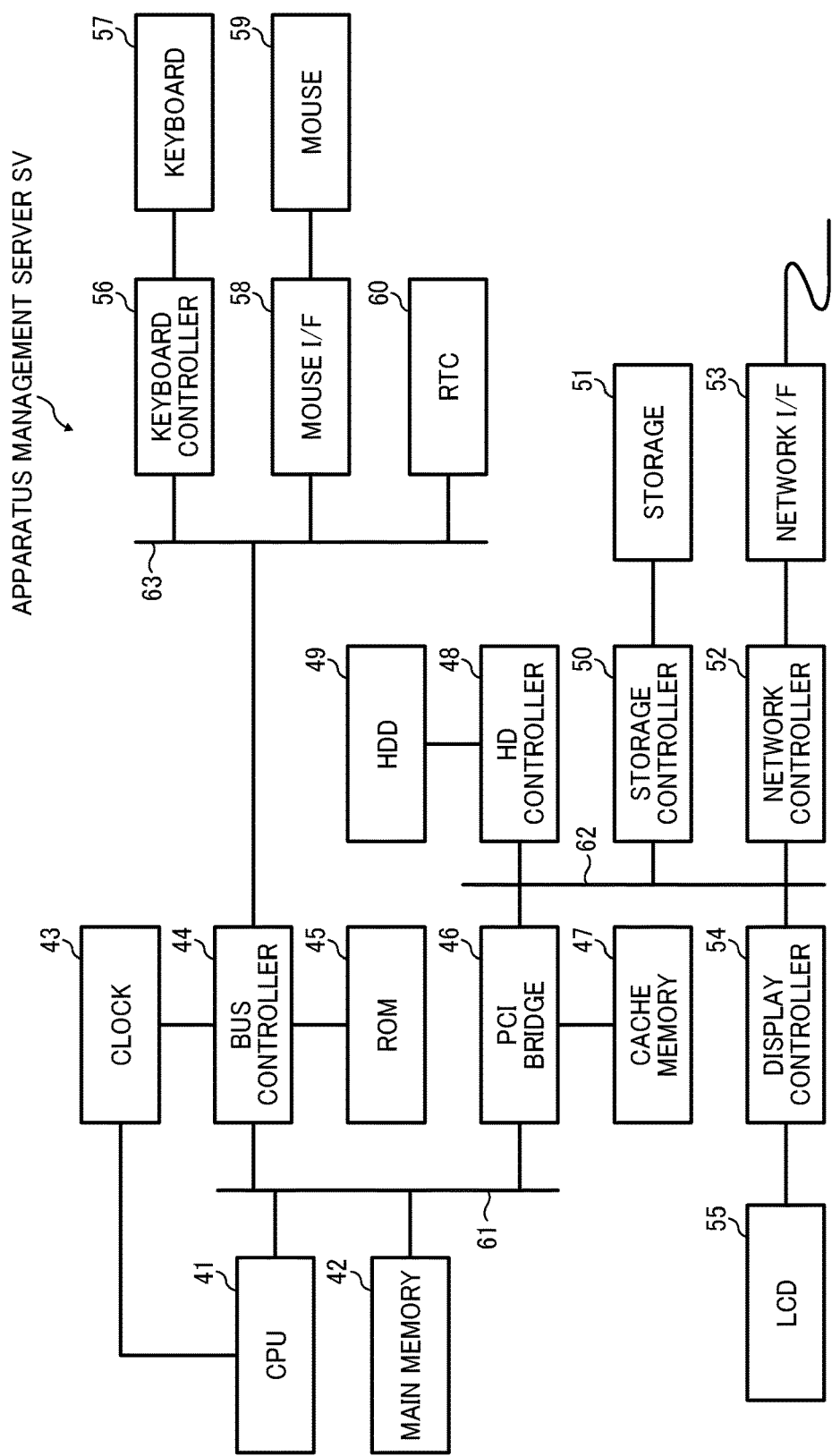
FIG. 7 is a diagram illustrating functional blocks of a device management server in the first embodiment of the present invention.

Generic servers and computers can be used as the device management server SV, and the device management server SV includes a block configuration in FIG. 7. The device management server SV includes a CPU 41, a main memory 42, a clock 43, a bus controller 44, a ROM 45, a Peripheral Component Interconnect (PCI) bridge 46, a cache memory 47, a hard disk drive (HDD) controller 48, a HDD, a storage controller 50, a storage 51, a network controller 52, a network interface (I/F) 53, a display controller 54, a liquid crystal display (LCD) 55, a keyboard controller 56, a keyboard 57, a mouse I/F 58, a mouse 59, a real time clock (RTC) 60, a CPU bus 61, a PCI bus 62, and a X bus (internal bus) 63 etc.

The ROM 45 stores a control process program and system data for the device management server SV. Especially, the ROM 45 prestores a system boot program after power-on and program for controlling various devices.

The HDD 49 stores an operating system (OS), a device management program that the device management server SV executes among device management programs in this embodiment, various application programs and various data etc.

For example, a Dynamic Random-Access Memory (DRAM) is used for the main memory 42, and the main memory 42 is used as a work memory etc. for the CPU 41.

The CPU 41 executes and processes the control process program stored in the ROM 45, the OS read from the HDD 49 to the main memory 42, various application programs and the device management program.

The clock 43 includes a crystal oscillator and a frequency divider etc. and generates a clock for controlling operating timing of the CPU 41 and the bus controller 44.

The bus controller 44 controls data transfer in the CPU bus 61 and the X bus 63.

The PCI bridge 46 transfers data between the PCI bus 62 and the CPU 41 using the cache memory 47.

The DRAM is used for the cache memory 47, and the PCI bridge 46 uses the cache memory 47.

The HDD controller 48 includes an interface between the HDD 49 such as Serial Advanced Technology Attachment (SATA) I/F to transfer data between the HDD 49 at high speed.

The storage 51 includes multiple mass storage HDDs. Especially, the storage 51 stores the user ID, type ID, configuration information for functions transferred by the image processing apparatuses P11 to P1n, and the device ID of the mobile device KT associating with each other as management data used for executing the device management process by the device management server SV.

The storage controller 50 includes an interface with the storage 51 such as SATA I/F to transfer data between the storage 51 at high speed.

The network controller 52 is connected to the network I/F 53, and the network I/F 53 is connected to the Internet IN. The network controller 52 controls communication between other devices connected to the Internet IN via the network I/F 53. That is, the network controller 52 controls communication between each of the image processing apparatuses P11 to P1n and the authentication server NSV in the managed network KN and each of the image processing apparatuses P21 to P2m in the telework network TN.

The display controller 54 converts character data and graphic data etc. using Digital/Analog (D/A) conversion and controls displaying the data on the LCD 55.

The keyboard 57 is connected to the keyboard controller 56, and the keyboard controller 56 converts key codes input from the keyboard 57 from serial data to parallel data.

The mouse 59 is connected to the mouse I/F 58, and the mouse I/F 58 is controlled by a mouse driver (a control program) to acquire operation information of the mouse 59 as digital data.

The RTC 60 includes an oscillator and the frequency divider etc. and is backed up using a battery to keep current date and time.

Figure 8:
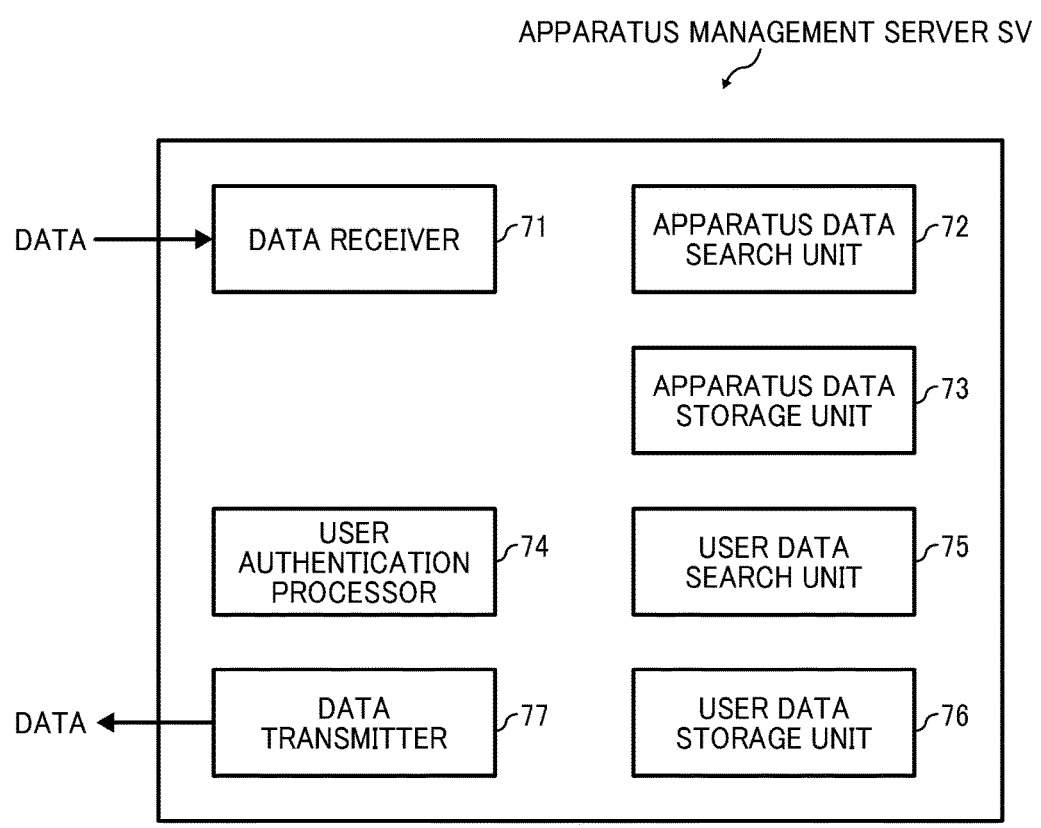
FIG. 8 is a diagram illustrating functional blocks of a device management server in the first embodiment of the present invention.

In the device management server SV, functional blocks in FIG. 8 are implemented by installing a device management program executed by the device management server SV among the device management programs in this embodiment.

That is, in the device management server SV, after installing the device management program described above, a data receiver 71, a device information search unit 72, a device information storage unit 73, a user authentication processor 74, a user data search unit 75, a user data storage unit 76, and a data transmitter 77 etc. in FIG. 8 are implemented.

The data receiver 71 are implemented by the network I/F 53 and the network controller 52 etc. and receives data from the image processing apparatuses P11 to P1n in the managed network KN and the image processing apparatuses P21 to P2m in the telework network TN.

The data receiver 71 checks the received data. If the received data corresponds to the device ID of the mobile device KT sent by the image processing apparatuses P11 to P1n, the type ID of the image processing apparatuses P11 to P1n, or the configuration information for functions of the image processing apparatuses P11 to P1n, the data receive 71 passes the received data to the device information search unit 72 and requests to store the received data in the device information storage unit 73. If the received data corresponds to the user information (user ID and password) sent by the image processing apparatuses P11 to P1n or P21 to P2m, the data receiver 71 passes the received data to the user authentication processor 74 and requests to authenticate the user.

If the authentication result is appropriate (OK) and the received data corresponds to a configuration information registration command sent by the image processing apparatuses P11 to P1n, the data receiver 71 passes the received data to the device information search unit 72 and requests to store the received data in the device information storage unit 73.

If the authentication result is appropriate (OK) and the received data corresponds to the configuration information acquisition command including the user ID and the type ID sent by the image processing apparatuses P21 to P2m, the data receiver 71 passes the user information and the type ID to the device information search unit 72.

The user information storage unit (information storage unit) 76 includes the storage 51 and the storage controller 50 etc. and stores user information that includes the user ID and password of the user who uses the image processing apparatuses P11 to P1n and P21 to P2m. The user information is input using the keyboard 57 by the device management server SV's administrator operation.

The device information storage unit 73 includes the storage 51 and the storage controller 50 etc. The device information storage unit 73 stores the password of the user ID received by the data receiver 71, the device ID of the mobile device KT (the third device identification information), the type ID and the configuration information of functions included in the image processing apparatuses P11 to P1n.

The user authentication processor (user appropriateness determination unit) 74 is implemented by the CPU 74 and performs the user authentication checking whether or not the user information including the user ID and password received from the data receiver 71 are registered in the user information storage unit 76.

After receiving the configuration information registration command that includes the user identification information, the device ID (the third device identification information), and the type ID from the image processing apparatuses P11 to P1n, the device information search unit (storing controller) 72 stores the third device identification information and the type ID in the device information storage unit 73 associating with the user identification information. In addition, based on the user ID and the type ID passed by the data receiver 71, the device information search unit 72 searches through the device information storage unit 73 to read the configuration information and the device ID corresponding to the user ID and the type ID.

The data transmitter (device information transmitter) 77 includes the network I/F 53 and the network controller 52 etc. The data transmitter 77 transfers sent data to the image processing apparatuses P11 to P1n in the managed network KN and the image processing apparatuses P21 to P2m in the telework network TN via the Internet IN. More specifically, the data transmitter 77 transfers response information as the authentication result by the user authentication processor 74 to the image processing apparatuses P11 to P1n and P21 to P2m via the Internet. In addition, the data transmitter 77 transfers the device ID of the mobile device KT and the configuration information of functions included in the image processing apparatuses P21 to P2m to the image processing apparatuses P21 to P2m.

As a whole, the authentication server NSV and the device management server SV described above are at least connected to the first electronic device and the second electronic device and functions as a device management apparatus that manages communication between the second electronic device and the third electronic device at least. In this embodiment, as the device management apparatuses, the authentication server NSV that includes the information storage unit, the user appropriateness determination unit, and the user appropriateness response unit is located in the managed network KN, and the device management server SV that includes the device information storage unit, the storing controller, the user appropriateness determination unit, and the device information transmitter is located outside of the managed network KN.

By reading the device management program in this embodiment stored in a computer-readable recording medium such as the ROM, Electrically Erasable and Programmable Read-only memory (EEPROM), EPROM, flash memory, flexible disc, Compact Disc Read-only memory (CD-ROM), Compact Disc Rewritable (CD-RW), Digital Versatile Disk (DVD), Universal Serial Bus (USB) memory, Secure Digital (SD) card, and Magneto-Optical (MO) disc etc. and installing the device management program in the image processing apparatuses P11 to P1n in the managed network KN, the image processing apparatuses P21 to P2m in the telework network TN, and the device management server SV, the device management system 1 is constructed as the device management system that executes the device management method enhancing usability of the electronic apparatuses and the mobile devices connected to the network (described later) and ensuring security of secret information. The device management program is a computer-executable program written in legacy programming languages and object-oriented programming languages such as assembler, C, C++, C#, and Java etc., and the power supply control program can be distributed by storing in the recording medium described above.

Next, workings in this embodiment are described below. The device management system 1 in this embodiment enhances usability of electronic apparatuses connected to network, i.e., the image processing apparatuses P11 to P1n and P21 to P2m and the mobile device KT and ensures security of secret information.

That is, in the device management system 1, the mobile device KT used for operating the image processing apparatuses P11 to P1n and receiving/transferring data within the managed network KN where secret information is managed can also be used in the telework network TN ensuring security.

Figure 9:
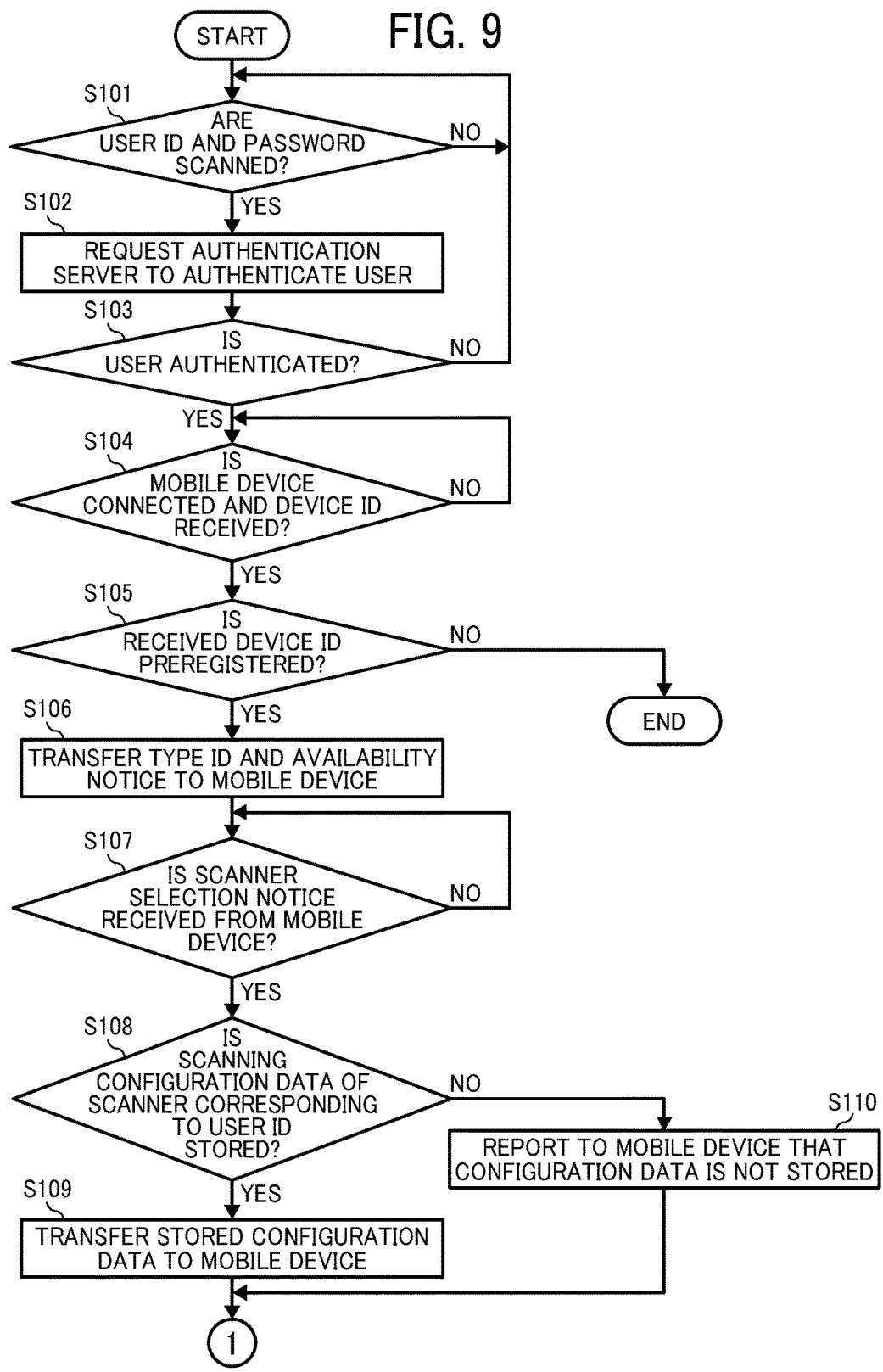
FIG. 9 is a flowchart illustrating a device management process performed by the image processing apparatus in the managed network as the first embodiment of the present invention.
Figure 10:
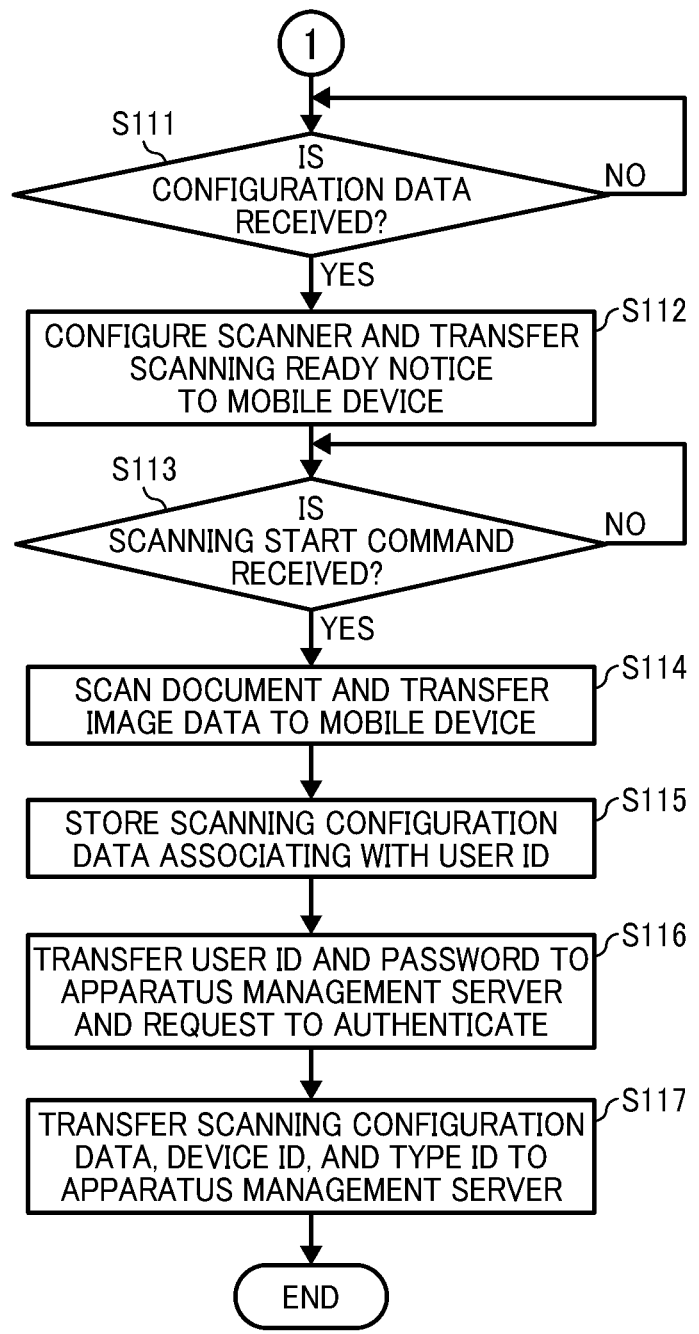
FIG. 10 is a flowchart illustrating a process continued from FIG. 9.

First, a device management process performed by the image processing apparatuses P11 to P1n within the managed network KN is described below with reference to FIGS. 9 and 10. In FIGS. 9 and 10, the scanner function of the MFP P11 among the image processing apparatuses P11 to P1n is operated via the mobile device KT, and image data of the scanned document is transferred to the mobile device KT by user operation. The description below can applied to cases that other image processing apparatuses P11 to P1n and other functions are operated via the mobile device KT.

In FIG. 9, in the MFP P11, the identification information acceptance unit 21 checks whether or not the user ID and the password are acquired by scanning the IC card on which the user ID and password are recorded using the IC card reader etc. in S101.

In the MFP P11, if the identification information acceptance unit 21 acquires the user ID and password (YES in S101), the inquiry unit 22 transfers the user ID and password to the authentication server NSV and requests the user authentication in S102.

In the MFP P11, after checking whether or not the user authentication result is appropriate (OK) in S103, if the authentication result is inappropriate (NO in S103), the process goes back to S101, and steps S101 to S103 are repeated as described above.

If the authentication result by the authentication server NSV is appropriate (YES in S103), the usage acceptance unit 26 waits for being connected by the mobile device KT and receiving the usage request along with the device ID in S104.

In S104, in case of receiving the usage request along with the device ID from the mobile device KT (YES in S104), the usage acceptance unit 26 checks whether or not the device ID is registered in the device information storage unit 27 in S105.

That is, after mounting a document on the scanner of the MFP P11, the mobile device KT is connected to the MFP P11 specifying IP address of the MFP P11 via the wireless access point and the network NW1 operating the mobile device KT by user operation. After connecting to the MFP P11, the mobile device KT transfers its device ID to the MFP P11.

In S105, if the device ID is not registered in the device information storage unit 27 (NO in S105), the usage acceptance unit 26 rejects usage of the image processing apparatuses P11 to P1n by the mobile device KT with the device ID, and the device management process ends.

In S105, if the device ID is registered in the device information storage unit 27 (YES in S105), the usage acceptance unit 26 allows the mobile device KT with the device ID to use the image processing apparatuses P11 to P1n. After allowing use, the usage acceptance unit 26 transfers the type ID of the MFP P11 and allowance notice indicating that the MFP P11 is available to the mobile device KT in S106.

Although not shown in figures, after receiving the type ID and the availability notification, the mobile device KT displays a function selection screen for selecting available functions of the image processing apparatuses P11 to P1n corresponding to the type. For example, the mobile device KT displays selection buttons such as "copy", "print", and "scan" on the function selection screen, and if the function is selected on the function selection screen by user operation, the mobile device KT transfers the selected function to the MFP P11.

In the MFP P11, the device communication unit 23 waits for selection notification of function to be used, i.e., the scan function in FIG. 9, from the mobile device KT in S107. In S107, in case of receiving the function selection notification (YES in S107), the usage controller 25 checks whether or not scanning configuration information (configuration information) is registered in the device information storage unit 27 associated with the user ID in S108.

In S108, if the scan configuration information is registered in association with the user ID (YES in S108), the usage controller 25 transfers the scan configuration information to the mobile device KT via the device communication unit 23 in S109.

In S108, if the scan configuration information is not registered in association with the user ID (NO in S108), the usage controller 25 notifies the mobile device KT that the configuration information is not registered via the device communication unit 23 in S110.

After receiving the scan configuration information, for example, the mobile device KT displays the configuration confirmation screen G2 in FIG. 4 reflecting the scan configuration information on the display. After receiving the notification that the configuration information is not registered, for example, the mobile device KT displays the scan configuration screen G1 in FIG. 3 on the display.

The mobile device KT transfers the configuration information indicating the configuration content to the MFP P11 after modifying configuration and pressing the "OK" button on the configuration confirmation screen G2 or operating configuration and pressing the "OK" button on the scan configuration screen G1.

As shown in FIG. 10, the MFP P11 waits for receiving the configuration information in S111. After receiving the configuration information (YES in S111), the usage controller 25 configures the scanner based on the received configuration information. After finishing configuring the scanner, the usage controller 25 transfers a scanning ready notice to the mobile device KT in S112 and waits for receiving a scanning start command in S113. For example, the usage controller 25 stores the user information (the user ID and password), the configuration information, and the device ID in a temporary folder in the storage unit 15.

In this case, the usage controller 25 compares the scan configuration information transferred to the mobile device KT with the scan configuration information received from the mobile device KT. If those pieces of information are the same, it is omitted to register the scan configuration information in the device data storage unit 27.

After receiving the scanning ready notice, the mobile device KT displays a message indicating that scanning can be started and a start button on the display. After the start button is pressed, the mobile device KT transfers a scanning start command to the MFP P11.

After receiving the scanning start command from the mobile device KT (YES in S113), the usage controller 25 controls the scanner to scan an image on the document based on the scan configuration information. The usage controller 25 transfers image data of the document scanned by the scanner to the mobile device KT via the device communication unit 23 in S114.

The mobile device KT stores the transferred image data in the internal flash ROM etc. and displays the transferred image data on the display.

In addition, the usage controller 25 stores the scan configuration information of the scanner in the device data storage unit 27 in association with the user ID in S115. In this case, if the scan configuration information is not registered in the device data storage unit 27 in association with the user ID, the usage controller 25 registers the scan configuration information newly. By contrast, if the scan configuration information has already been registered, the usage controller 25 either does not register the information or updates the registration. That is, if the scan configuration information same as the scan configuration information to be written has already been registered in the device data storage unit 27, the usage controller 25 does not update the information. By contrast, if the scan configuration information that has already been registered is different from the scan configuration information to be written, the usage controller 25 updates the registration.

Next, in the MFP P11, the device data notification unit 24 transfers the user information (user ID and password) stored in the device data storage unit 27 to the device management server SV to request the authentication and confirmation in S116.

After the user information (user ID and password) and the authentication and confirmation request from the image processing apparatuses P11 to P1n in the managed network KN, in the device management server SV, the user authentication processor 74 checks whether or not the user information is registered in the user data storage unit 76 to confirm the authentication. In the device management server SV, the data transmitter 77 transfers the authentication and confirmation result to the MFP P11.

After receiving the response indicating that the authentication and confirmation succeeded from the device management server SV, the device data notification unit 24 in the MFP P11 transfers the scan configuration information of the scanner, the device ID of the mobile device KT, and its own type ID to the device management server SV to report the device information in S117. In this case, the device data notification unit 24 transfers a data registration command along with the scan configuration information, device ID, and type ID to request the device management server SV to register these data. It should be noted that the device data notification unit 24 can omit to register these data in the device management server SV if the same configuration information, device ID, and type ID has already been registered in the device management server SV.

After receiving the configuration information, device ID, type ID, and the data registration command from the user-authenticated image processing apparatuses P11 to P1n, the device management server SV registers the configuration information, device ID, and type ID in the device data storage unit 73 in association with the authenticated user ID.

Next, if a logout button on the UI unit 12 of the MFP P11 is operated or predetermined no-operation time expires, the usage controller 25 logs out disabling user operation on the UI unit 12 and deletes data in the temporary folder in the device data storage unit 27. That is, after finishing processing, the usage controller 25 deletes the configuration information and the device ID stored in the temporary folder temporarily.

As described above, in some cases, it is desired that users who uses the image processing apparatuses P11 to P1n stores on-the road materials as data in the mobile device KT using the MFP P21 in the telework network TN.

In this case, it is impossible to register the device ID of the mobile device KT in the MFP P21, and it is impossible to store digitalized paper documents in the mobile device KT using the MFP P21 because it is desired to protect data security.

To cope with this issue, in the device management system 1 in this embodiment, registration information by the image processing apparatuses P11 to P1n is registered in the device management server SV. Subsequently, in the device management system 1, it is possible to use the image processing apparatuses P21 to P2m safely and appropriately by authenticating the device management server SV from the image processing apparatuses P21 to P2m in the telework network TN.

The cloud portal server (intervening apparatus) PS accepts accesses using multiple application services (cloud services) served via the Internet IN. The hardware configuration of the cloud portal server PS is similar to the hardware configuration of the device management server SV in FIG. 7.

Figure 11:
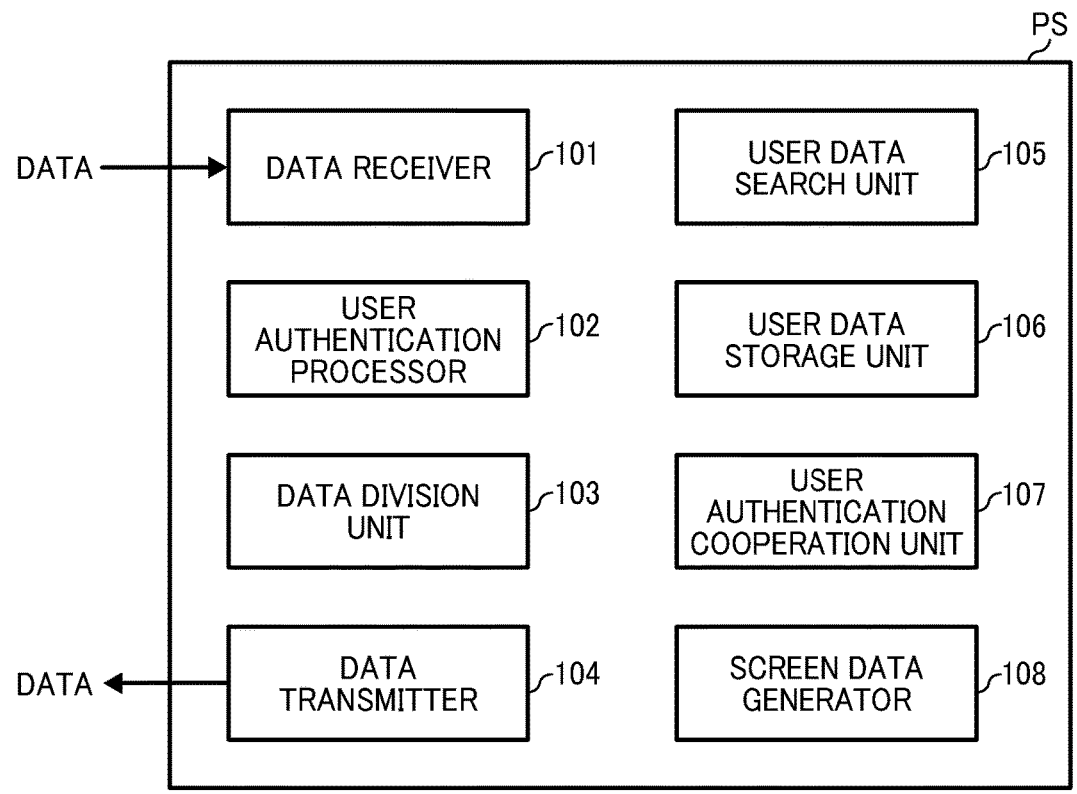
FIG. 11 is a diagram illustrating functional blocks of a cloud portal server in the first embodiment of the present invention.

In the cloud portal server PS, functional blocks in FIG. 11 are implemented by installing a device management program executed by the cloud portal server PS among programs for the cloud portal server PS and the device management programs in this embodiment.

That is, as shown in FIG. 11, in the cloud portal server PS, a data receiver 101, a user authentication processor 102, a data division unit 103, a data transmitter 104, a user data search unit 105, a user data storage unit 106, a user authentication cooperation unit 107, and a screen data generator 108 are implemented.

The data receiver 101 communicates with the computers connected to the Internet IN, the image processing apparatuses P11 to P1n, the image processing apparatuses P21 to P2*m*, the device management server SV, and other apparatuses to receive data and check the received data.

If the received data corresponds to the user information (user ID and password), the data receiver 101 passes the received data to the user authentication processor 102. If the received data does not correspond to the user information (user ID and password), the data receiver 101 passes the received data to the data division unit 103.

The user authentication processor (user appropriateness determination unit) 102 checks whether or not the user ID and password received from the data receiver 101 are registered in the user information storage unit 106.

The data division unit 103 selects a server that executes corresponding application service in accordance with the content of the received data (request).

The data transmitter (response unit) 104 transfers screen data to be displayed on a web browser to the computers connected to the Internet IN, the image processing apparatuses P11 to P1*n*, the image processing apparatuses P21 to P2*m*, the device management server SV, and other apparatuses and transfers a request to a server that executes an application service.

The user data storage unit 106 stores the user information (user ID and password) of users who uses an application service from the computers connected to the Internet IN, the image processing apparatuses P11 to P1*n*, the image processing apparatuses P21 to P2*m*, the device management server SV, and other apparatuses.

The user data search unit 105 searches for the user information stored in the user data storage unit 106 and read the searched user information.

The user authentication cooperation unit (recognition cooperation unit) 107 performs a single sign-on function that transfers the user information (user ID and password) authenticated by the user authentication processor 102 to a server that executes the application service. Especially, after receiving the address of the image processing apparatuses P21 to P2*m*, the user identification information, and the type ID of the image processing apparatuses P21 to P2*m* from the image processing apparatuses P21 to P2*m* that transfers a response information indicating that the user information (user identification information) is appropriate, the user authentication cooperation unit 107 transfers the address of the image processing apparatuses P21 to P2*m*, the user information and the type ID of the image processing apparatuses P21 to P2*m* to the device management server (device management apparatus) SV.

The screen data generator 108 generates screen data displayed on the web browser in the computers connected to the Internet IN, the image processing apparatuses P11 to P1*n*, the image processing apparatuses P21 to P2*m*, the device management server SV, and other apparatuses. The cloud portal server PS functions as the web server as a whole.

That is, in the device management system 100 in this embodiment, the cloud portal server PS authenticates the user information (user ID and password) from the image processing apparatuses P21 to P2*m* in the telework network TN. In addition, the cloud portal server PS performs a cooperation process that relays the configuration information acquisition request and the device information acquisition request from the authenticated user to the device management server SV. In this case, the image processing apparatuses P21 to P2*m* transfers the user ID, IP address of the image processing apparatuses P21 to P2*m*, and the type ID of the image processing apparatuses P21 to P2*m* along with the configuration information acquisition request or the device information acquisition request to the cloud portal server PS.

In the device management system 100 in this embodiment, the cloud portal server PS intervenes between the image processing apparatuses P21 to P2*m* in the telework network TN and the device management server SV.

In the cloud portal server PS, the user data storage unit 106 prestores the user information (user ID and password) who is allowed to use the device management server SV. It is possible to register the user information in the user data storage unit 106 in the cloud portal server PS by server administrator operation. Otherwise, it is possible to register the user information in the user data storage unit 106 in the cloud portal server PS by transferring the user information registered in the user data storage unit 76 in the device management server SV.

Usually, if a user who uses the image processing apparatuses P11 to P1*n* in the managed network KN via the mobile device KT uses the image processing apparatuses P21 to P2*m* in the telework network TN via the same mobile device KT, the user is managed by the device management server SV via the cloud portal server PS.

That is, for example, in case of using the MFP P21 in the telework network TN, the user information (user ID and password) is input on the MFP P21 by user operation.

The MFP P21 requests the cloud portal server PS to authenticate the user by transferring the user information to the cloud portal server PS.

Figure 12:
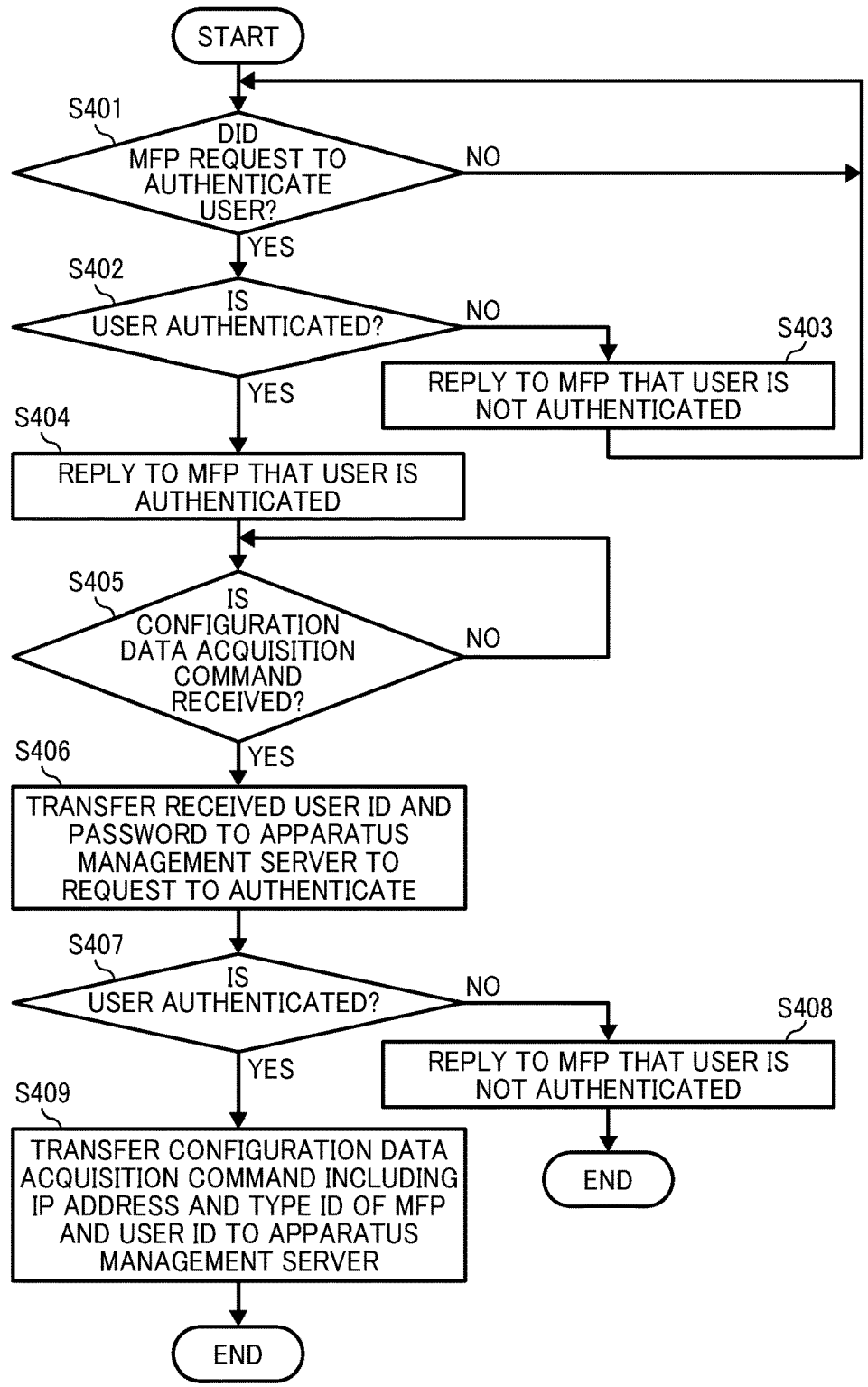
FIG. 12 is a flowchart illustrating an intermediate process performed by the cloud portal server.

Next, as shown in FIG. 12, the cloud portal server PS performs the intervention process. In FIG. 12, the MFP P21 is used by user operation. However, the similar process can be applied in case of using the other image processing apparatuses P21 to P2*m* in the telework network TN.

That is, as shown in FIG. 12, in the cloud portal server PS, if the data receiver 101 receives the user information from the MFP P21 and detects the user authentication request in S401, the user information is passed to the user authentication processor 102.

The user authentication processor 102 searches through the user data storage unit 106 base on the user ID of the user information to determine whether or not the authentication is OK by searching if the password of the user information is registered in association with the user ID in S402.

If the user authentication is not OK (NO in S402), the user authentication processor 102 requests the data transmitter 104 to notify the MFP P21 that the user authentication is not OK in S403, and the process goes back to S401.

If the user authentication is OK (YES in S402), the user authentication processor 102 requests the data transmitter 104 to notify the MFP P21 that the user authentication is OK in S404.

In the cloud portal server PS, after succeeding the user authentication by the user authentication processor 102, the data receiver 101 waits for receiving the configuration information acquisition command from the MFP P21 in S405.

In S405, in case of receiving the configuration information acquisition command (YES in S405), the user authentication cooperation unit 107 requests the data transmitter 104 to transfer the authenticated user information to the device management server SV to request for authentication in S406. The MFP P21 transfers the configuration information acquisition command including its own IP address, type ID, and the user ID to the cloud portal server PS. The cloud portal server PS stores IP address and type ID of the MFP P21 and user ID and password in the temporary folder temporarily. After finishing the process, the cloud portal server PS discards these data.

After receiving the user information and the authentication request from the cloud portal server PS, the user authentication processor 74 in the device management server SV searches through the user data storage unit 76 based on the user ID and password to authenticate the user. After succeeding in the user authentication, the device management server SV sends back the authentication OK result to the cloud portal server PS. After failing in the user authentication, the device management server SV sends back the authentication fail result to the cloud portal server PS.

After requesting the authentication, in the cloud portal server PS, the user authentication cooperation unit 107 checks whether or not the authentication result that the data receiver 101 receives from the device management server SV is OK in S407.

In S407, if the authentication result is not OK (NO in S407), the user authentication cooperation unit 107 requests the data transmitter 104 to notify the MFP P21 that the user authentication failed in S408, and the process ends.

In S407, if the authentication result is OK (YES in S407), the user authentication cooperation unit 107 transfers the configuration information acquisition command including IP address and the type ID of the MFP P21 and user ID to the device management server SV in S409. After finishing the process, the cloud portal server PS discards IP address and type ID of the MFP P21 and user ID and password stored in the temporary folder temporarily.

After receiving the configuration information acquisition command including IP address and the type ID of the MFP P21 and the user ID, the device data search unit 72 reads the configuration information and the device ID corresponding to the user ID and the type ID from the device data storage unit 73. The device data search unit 72 requests the data transmitter 77 to transfer the read configuration information and the device ID to the MFP P21 whose IP address is included in the received configuration information acquisition command.

Figure 13:
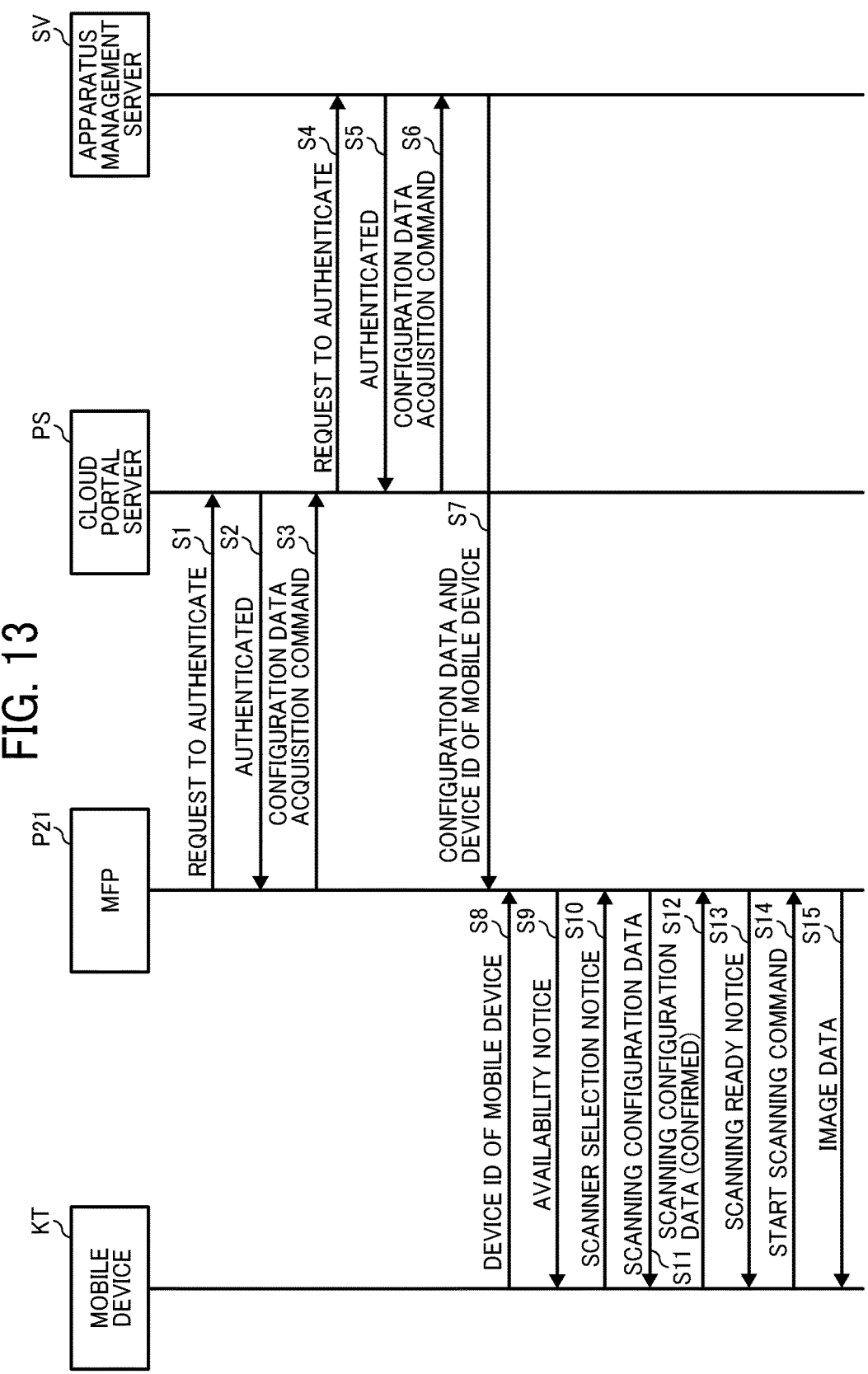
FIG. 13 is a sequence diagram illustrating a device management process in the first embodiment of the present invention.

That is, as shown in FIG. 13, in the device management system 100, after inputting the user information on the MFP P21 by user operation, the MFP P21 requests the cloud portal server PS to authenticate the user information in S1. In case of authenticating the user information and succeeding in the authentication, the cloud portal server PS sends back the authentication OK result to the MFP P21 in S2. The MFP P21 transfers the configuration information acquisition command including its own IP address, type ID, and the user ID to the cloud portal server PS in S3.

The cloud portal server PS transfers the authentication information to the device management server SV to request the authentication in S4.

After succeeding in the authentication, the device management server SV sends back the authentication OK result to the cloud portal server PS in S5.

After receiving the authentication OK result, the cloud portal server PS transfers the configuration information acquisition command including IP address and type ID of the MFP P21 and the user ID to the device management server SV in S6.

After receiving the configuration information acquisition command, the device management server SV acquires the configuration information corresponding to the user ID and the type ID and the device ID of the mobile device KT and transfers them to IP address of the MFP P21 in S7.

After receiving the configuration information and the device ID from the device management server SV, in case of receiving the device ID from the mobile device KT in S8, the MFP P21 determines whether or not both of the device IDs match. If they match, the MFP P21 transfers the availability notice indicating that the MFP P21 is available for the mobile device KT to the mobile device KT with the corresponding device ID in S9.

Next, after receiving the scanner selection notice from the mobile device KT in S10, the MFP P21 transfers the scanning configuration information of the scanner to the mobile device KT in S11.

After receiving the scanning configuration information from the scanner in S12, the MFP P21 configures scanning in accordance with the scanning configuration information and notifies the mobile device KT of the scanning ready notice in S13.

After receiving the start scanning command from the mobile device KT in S14, the MFP P21 scans an image on the document and transfers the image data to the mobile device KT in S15. Subsequently, the MFP P21 transfers the image data of the document to the mobile device without storing the image data in the MFP P21.

It should be noted that the device management method is not limited to the case described above. For example, it is possible that the device management server SV registers the type ID and the device ID in association with the user ID, and it is possible that the configuration information is not registered. In this case, in the device management system 1, the image processing apparatuses P21 to P2m in the network other than the managed network KN, i.e., in the telework network TN can be used via the mobile device KT. As a result, in the device management system 1 in this case, it is possible to exchange data between the image processing apparatuses P21 to P2m in the telework network TN and the mobile device KT whose device ID is registered in the device management server SV, enhancing usability and ensuring confidentially.

In addition, as the device management method in the device management system 100, with the same hardware configuration and the software configuration, it is possible that the cloud portal server PS and the image processing apparatuses P21 to P2m in the telework network TN issue a cooperating device acquisition command instead of the configuration information acquisition command. The cooperating device acquisition command includes the type ID and the user ID to be transferred to the device management server SV via the cloud portal server PS by the image processing apparatuses P21 to P2m and request for the device ID of the mobile device KT allowed to cooperate with the image processing apparatuses P21 to P2m with the corresponding type ID.

In this case, the device management server SV registers the type ID, the device ID, and the configuration information in association with the user ID, and the cooperating device acquisition command is transferred by the image processing apparatuses P21 to P2m via the cloud portal server PS instead of the configuration information acquisition command. After receiving the cooperating device acquisition command that includes the type ID and the user ID, the device management server SV reads the device ID registered in association with the type ID and the user ID among the device IDs registered in association with the user ID and transfers the read device ID to the image processing apparatuses P21 to P2m. After receiving the device ID, the image processing apparatuses P21 to P2m stores the device ID in the temporary folder temporarily. In case of receiving the device ID notice from the mobile device KT, if the device IDs match, it is allowed to use the image processing apparatuses P21 to P2m via the mobile device KT.

As described above, the device management system 100 in this embodiment further includes the cloud portal server (intervening apparatus) PS connected to the Internet IN that can connect to the image processing apparatuses P21 to P2m as the second electronic device and the device management server (device management apparatus) SV at least that intervenes various operations using the network. The cloud portal server PS includes the user data storage unit (data storage unit) 106 that stores the user identification information of user who is allowed to use the image processing apparatuses P21 to P2m, the user authentication processor (applicability determination unit) 102 that refers to the user data storage unit 106 based on the user identification information and determines whether or not the user identification information is applicable after transferring the user identification information by the image processing apparatuses P21 to P2m and inquiring whether or not the user identification information is applicable, the data transmitter (response unit) 104 that transfers the response information indicating that the user identification information is applicable to the image processing apparatuses P21 to P2m if the user identification information is applicable, and the user authentication cooperation unit (cooperation unit) 107 that transfers the user identification information to the device management server SV to request authentication after receiving the configuration information acquisition command including the user identification information, address of the image processing apparatuses P21 to P2m, and the type ID (model identification information) from the image processing apparatuses P21 to P2m to which the response information indicating that the user identification information is applicable is transferred. The device management server SV includes the user authentication processor (user applicability determination unit 102) that determines whether or not the user identification information is applicable referring to the user data storage unit 106 based on the user identification information after receiving the user identification information from the cloud portal server PS and inquiring whether or not the user identification information is applicable, the data transmitter (response unit) 104 that transfers the response information indicating that the user identification information is applicable if the determination result by the user authentication processor 102 is applicable, and the second response unit that transfers the user identification information, the configuration information corresponding to the type ID, and the third device identification information to the address of the image processing apparatuses P21 to P2m after receiving the configuration information acquisition command that includes the user identification information, the address of the image processing apparatuses P21 to P2m, and the type ID (model identification information) from the cloud portal server PS.

Consequently, if there is the intervening apparatus such as the cloud portal server PS etc. in the network, it is possible to make efficient use of the intervening apparatus, enhancing usability of the image processing apparatuses P21 to P2m and ensuring security of secret information.

In addition, in the device management system 100 in this embodiment, the third electronic device is the mobile device KT that communicates and exchanges data with the image processing apparatuses P11 to P1n as the first electronic device and the image processing apparatuses P21 to P2m as the second electronic device at different timing.

As a result, it is possible to use the image processing apparatuses P11 to P1n along with the data communication via the mobile device KT just like using the image processing apparatuses P21 to P2m in the other network NW2 via the same mobile device KT, ensuring security of secret information. As a result, it is possible to use the image processing apparatuses P11 to P1n and the image processing apparatuses P21 to P2m via the different network using the same mobile device KT, enhancing usability much more.

Furthermore, in the device management system 1 in this embodiment, in the image processing apparatuses P11 to P1n as the first electronic device, the device data notification unit 24 as the data transfer unit transfers the user identification information, the model identification information, and its own configuration information to the device management server SV. In the device management server SV, the device data search unit (storage controller) 72 stores the configuration information transferred by the image processing apparatuses P11 to P1n in the device data storage unit 73 associating with the user identification information and the type ID. After receiving the user identification information and the model identification information from the image processing apparatuses P21 to P2m as the second electronic device, the data transmitter 77 as the device data transmitter transfers the third device identification information and the configuration information stored in the device data storage unit 73 in association with the user identification information and the type ID to the image processing apparatuses P21 to P2m. Consequently, it is possible to use the image processing apparatuses P21 to P2m applying the configuration information used by the image processing apparatuses P11 to P1n to the image processing apparatuses P21 to P2m. As a result, it is possible to use the image processing apparatuses P11 to P1n and the image processing apparatuses P21 to P2m belonging to different networks using the same configuration information, ensuring security of secret information and enhancing usability much more.

In the device management system 1 in this embodiment, if the third device identification information of the third electronic device sent from the device management server SV does not match with the third device identification information included in the communication request sent from the third electronic device, the usage controller (communication controller) 34 in the image processing apparatuses P21 to P2m allows communication with the limited communication function.

As a result, it is possible to use the image processing apparatuses P21 to P2m, ensuring security of secret information.

In the device management system 1 in this embodiment, if the communication with the mobile device KT etc. allowed to communicate based on the third device identification information ends or non-communication status continues for a predetermined period of time, the usage controller (communication controller) 34 in the image processing apparatuses P21 to P2m discards the third device identification information used for the communication allowance.

As a result, it is possible to prevent the third device identification information from leaking and being misused, enabling to use the image processing apparatuses P21 to P2m via the network and ensuring security of secret information much more.

Second Embodiment

Figure 14:
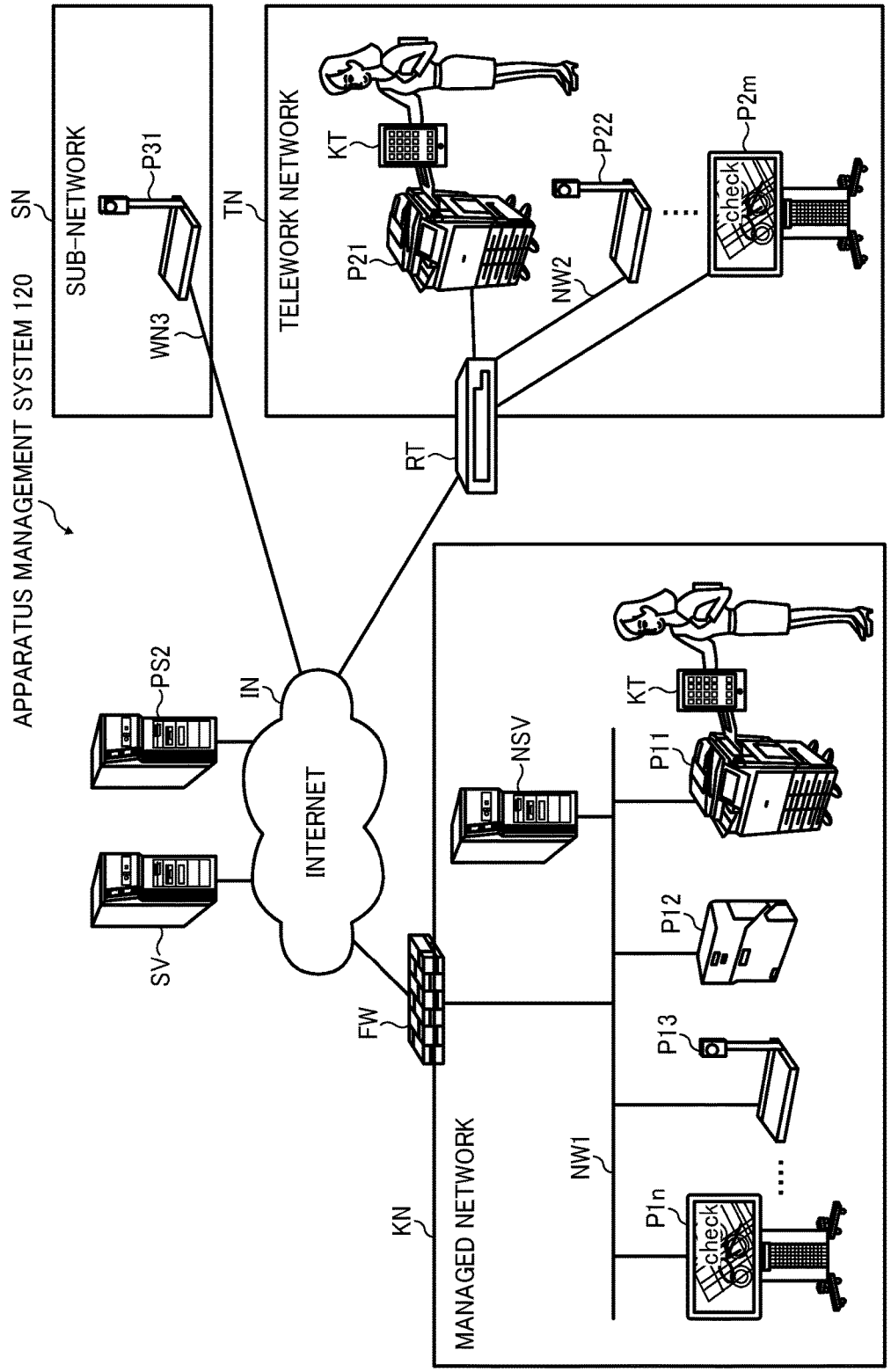
FIG. 14 is a diagram illustrating a configuration of the device management system as a second embodiment of the present invention.

The device management system and the device management method in this embodiment are described below with reference to FIGS. 14 to 16. FIG. 14 is a diagram illustrating a configuration of the device management system 120 in this embodiment.

The device management system 120 is applied to the device management system same as the device management system 100 in the first embodiment, and same symbols are used for the same components (including components not shown in figures) as the first embodiment in the description below.

As shown in FIG. 14, in the device management system 120, the cloud portal server PS is connected to the same network configuration as the device management system 100 in the first embodiment. That is, in the device management system 120, the managed network KN, the telework network TN, the device management server SV, the sub-network SN, and the cloud portal server PS2 are connected to the Internet IN. The device management server SV and the cloud portal server PS2 function as the device management apparatus as a whole.

As shown in FIG. 14, in the device management system 120, there are the managed network KN, the telework network TN, and the device management server SV just like the device management system 100 in the first embodiment, and the sub-network SN is connected to the Internet IN.

The sub-network SN is connected to the Internet IN, and the videoconference terminal P31 etc. are connected to the network NW3 such as LAN via the router etc. (not shown in figures).

Basically, the videoconference terminal (the third electronic device) P31 includes the configuration in FIG. 2 and includes a camera, a microphone, and a speaker etc. as the engine unit 14 to hold a videoconference session. The videoconference session is hold between the videoconference terminal P31 and the videoconference terminal P13 in the managed network KN via the Internet IN.

In this case, in case of holding the videoconference session between the managed network KN and the sub-network SN, the user information (user ID and password) is input on the UI unit 12 in the videoconference terminal P13. The UI unit 12 includes the user information input unit that inputs the user information such as the IC card reader that scans the IC card in which the user ID and password are stored. The videoconference terminal P13 transfers the input user information to the authentication server NSV to request the authentication confirmation.

After receiving the authentication confirmation request, the authentication server NSV checks whether or not the received user ID and password are registered to confirm the authentication and returns the authentication confirmation result indicating the authentication is OK or not to the videoconference terminal P13.

After receiving the authentication confirmation result indicating that the authentication is OK, the videoconference terminal P13 allows the user to use. Subsequently, a call operation is performed by inputting address of the videoconference terminal P31 in the sub-network SN on the videoconference terminal P13 by user operation. After calling the videoconference terminal P31, if the videoconference terminal P31 responds, the videoconference terminal P13 connects to the videoconference terminal P31 to hold the videoconference session.

In holding the videoconference session using the videoconference terminal P13, it is possible to use the mobile device KT as the other third electronic device to operate the videoconference terminals P13 and P31 etc. In addition, in case of using data communication in the videoconference session, it is possible to transfer data stored in the mobile device KT to the videoconference terminal P13 and P31 to send the data to the counterpart. In addition, it is possible to transfer the data received from the counterpart to the mobile device KT. In this case, the videoconference terminal P13 stores the device ID of the mobile device KT used to operate the videoconference terminal P13 in the device information storage unit 27.

After finishing the videoconference session, the videoconference terminal P13 transfers the user ID and password to the device management server to request the authentication confirmation. After succeeding in the authentication confirmation, the videoconference terminal P13 transfers the configuration information registration command including the address of the counterpart videoconference terminal P31 and its own configuration information along with the type ID of the videoconference terminal P13 to the device management server SV. In case of using the mobile device KT, the videoconference terminal P13 transfers the configuration information registration command including the user ID, password, and the device ID of the mobile device KT to the device management server SV.

After receiving the configuration information registration command, the device management server SV stores the received address of the videoconference terminal P31, the configuration information and the type ID of the videoconference terminal P13, and the device ID of the mobile device KT in the device data storage unit 73 in association with the user ID.

Next, after the user of the managed network KN goes out, it is possible to use the videoconference terminal P22 in the telework network TN to hold the videoconference session with the user in the sub-network SN.

In that case, the user information (user ID and password) is input using the IC card reader etc. in the videoconference terminal P22 in the telework network TN by user operation.

After acquiring the user information, the videoconference terminal P22 transfers the user information to the device management server SV to request the authentication confirmation.

After receiving the authentication confirmation request, as described above, the device management server SV authenticates the received user information and transfers the authentication confirmation result to the videoconference terminal P22.

After receiving the authentication confirmation result indicating that the authentication is OK, the videoconference terminal P22 transfers the configuration information acquisition command including the type ID of the videoconference terminal P22 and the user ID to the device management server SV.

After receiving the configuration information acquisition command, the device management server SV searches through the device data storage unit 73 based on the user ID and the type ID to read the configuration information stored in association with the user ID and the type ID and address of the counterpart videoconference terminal from the device data storage unit 73. In this case, if the device ID is registered, the device management server SV also reads the device ID. Subsequently, the device management server SV transfers the configuration information, address of the counterpart videoconference terminal, and the device ID (if the device ID is registered) to the videoconference terminal P22.

The videoconference terminal P22 stores the configuration information, address of the counterpart videoconference terminal, and the device ID (if the device ID is registered) received from the device management server SV in the temporary folder in the nonvolatile memory (flash ROM).

Next, a call operation is performed by inputting address of the videoconference terminal P31 in the sub-network SN on the videoconference terminal P22 by user operation.

The videoconference terminal P22 checks whether or not the input address matches with the address of the counterpart videoconference terminal received from the device management server SV preliminarily and stored in the nonvolatile memory. If both of the addresses match, the videoconference terminal P22 connects to the videoconference terminal P31 to start holding the videoconference session. Otherwise, the videoconference terminal P22 does not connect to the videoconference terminal P31 and displays a message indicating that it is impossible to communicate.

In case of using the mobile device KT to operate and transfer data etc., the videoconference terminal P22 checks whether or not the device ID received from the mobile device KT matches with the device ID received from the device management server SV. If the device IDs match, the videoconference terminal P22 allows use of the videoconference terminal P22 via the mobile device KT. Otherwise, the videoconference terminal P22 transfers a message indicating that the mobile device KT cannot be used to the mobile device KT.

After finishing the videoconference session with the videoconference terminal P31, the videoconference terminal P22 deletes the configuration information and address of the counterpart videoconference terminal stored in the nonvolatile memory. In addition, if the device ID is stored in the nonvolatile memory, the videoconference terminal P22 also deletes the device ID.

It should be noted that the videoconference terminal P22 in the telework network TN does not transfer address of the videoconference terminal P31 as the counterpart videoconference terminal and its own configuration information to the device management server SV.

As described above, in the device management system 120 in this embodiment, the third electronic device is the videoconference terminal (electronic device) P31 that is connected to the network NW3 different from the network NW1 connected to the image processing apparatuses P11 to P1$n$ and the network NW2 connected to the image processing apparatuses P21 to P2$m$ and communicates with the image processing apparatuses P11 to P1$n$ and P21 to P2$m$ at different timings to exchange data. After communicating with the third electronic device, in the image processing apparatuses P11 to P1$n$, the device data notification unit 24 as the information transmitter transfers at least the address of the third electronic device along with the user identification information and its own type ID (device type information) to the device management server SV. In the device management server SV, the device data search unit (storage controller) 72 stores the address of the third electronic device and the type ID received from the image processing apparatuses P11 to P1$n$ in the device data storage unit (device data storing unit) 73. After the user identification information and the model identification information is received from the image processing apparatuses P21 to P2$m$, the device data transmitter transfers the address of the third electronic device stored in the device data storage unit 73 in association with the user identification information and the model identification information to the image processing apparatuses P21 to P2$m$.

As a result, even if the third electronic device is the videoconference terminal P31 and the electronic whiteboard etc. that is connected to the network other than the networks that the image processing apparatuses P11 to P1$n$ and P21 to P2$m$ are connected to exchange data, it is possible to ensure security of secret information, enhancing usability.

In this case, it is possible to use the mobile device KT as the third electronic device with the image processing apparatuses P11 to P1$n$ and P21 to P2$m$ to communicate with the videoconference terminal P31 and the electronic whiteboard as the third electronic device. As a result, it is possible to enhance usability, ensuring security of secret information.

Furthermore, in this case, it is also possible that the image processing apparatuses P21 to P2$m$ use the configuration information that the image processing apparatuses P11 to P1$n$ use in communicating with the videoconference terminal P31 and the electronic whiteboard etc. as the third electronic device. As a result, it is possible to enhance usability further, ensuring security of secret information appropriately.

Just like the first embodiment, the cloud portal server PS2 accepts accesses in using multiple application services (cloud services) provided via the Internet. The hardware configuration of the cloud portal server PS2 is similar to the hardware configuration of the device management server SV in FIG. 7.

In the device management system 120 in this embodiment, IP addresses and type IDs of the multiple image processing apparatuses P21 to P2$m$ allowed to use are registered as a group in the device management serve SV. After authenticating user once by the device management server SV, those IP addresses and type IDs in the group are allowed to use.

Figure 15:
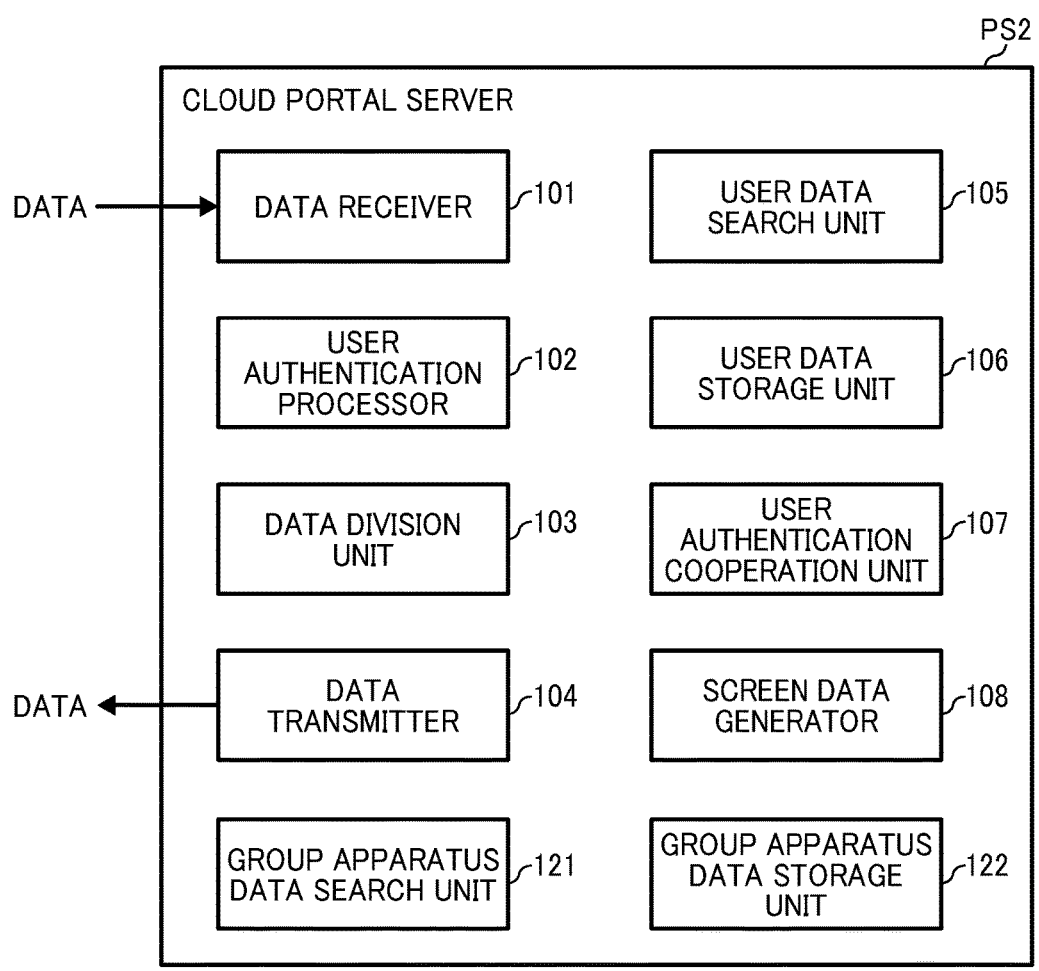
FIG. 15 is a diagram illustrating functional blocks of a cloud portal server in the second embodiment of the present invention.

In the cloud portal server PS2, functional blocks in FIG. 15 are implemented by installing a device management program executed by the cloud portal server PS2 among programs for the cloud portal server PS and the device management programs in this embodiment.

That is, as shown in FIG. 15, just like in FIG. 11, in the cloud portal server PS2, a data receiver 101, a user authentication processor 102, a data division unit 103, a data transmitter 104, a user data search unit 105, a user data storage unit 106, a user authentication cooperation unit 107, a screen data generator 108, a group apparatus data search unit 121, and a group apparatus data storage unit 122 are implemented.

Since the data receiver 101, the user authentication processor 102, the data division unit 103, the data transmitter 104, the user data search unit 105, the user data storage unit 106, the user authentication cooperation unit 107, and the screen data generator 108 are similar to the components shown in FIG. 11, those descriptions are omitted.

The group apparatus data storage unit (apparatus data storage unit) 122 is implemented by the nonvolatile memory such as the HDD and stores information (type ID) on multiple image processing apparatuses P11 to P1$n$ and P21 to P2$m$ used after one user authentication as a group.

The group apparatus data search unit 121 searches for all IP addresses and type IDs as grouped multiple apparatus information stored in the group apparatus data storage unit 122 and reads them.

Next, workings in this embodiment are described below. In the device management system 120 in this embodiment, the type IDs of the image processing apparatuses P11 to P1$n$ and P21 to P2$m$ allowed to use are registered as a group en bloc, and they are allowed to use as a group after one user authentication.

For example, in the telework network TN, it is assumed that the MFP P21, the videoconference terminal P22, and the electronic whiteboard P2$m$ are rented out as a set. To register the MFP P21, the videoconference terminal P22, and the electronic whiteboard P2*m* as a group, the cloud portal server PS2 is accessed using a web browser on a computer by administrator operation for example.

After accessing using the computer, the cloud portal server PS2 transfers data for various service menu screens to the computer.

The computer displays various service menu screens transferred by the cloud portal server PS2 on the browser.

A group registration service for the image processing apparatuses P21 to P2*m* is selected by administrator operation.

The cloud portal server PS2 transfers a screen data for inputting IP addresses and apparatus types (type IDs) of the image processing apparatuses P21 to P2*m* to be grouped to the computer.

On the input screen displayed on the computer, IP addresses and type IDs of the MFP P21, the videoconference terminal P22, and the electronic whiteboard P2*m* are input, and a registration button is pressed by administrator operation.

After the registration button is pressed, the computer transfers the input data to the cloud portal server PS2.

The cloud portal server PS2 groups the transferred IP addresses and type IDs of the MFP P21, the videoconference terminal P22, and the electronic whiteboard P2*m* and stores them in the group apparatus data storage unit 122 associating with a group name for example.

As described above, in this case, it is assumed that the image processing apparatuses P21 to P2*m* in the telework network TN are grouped and registered in the cloud portal server PS2. In this case, if a user who uses the image processing apparatuses P11 to P1*n* in the managed network KN uses the telework network TN, all grouped image processing apparatuses P21 to P2*m* can be used after one user authentication on any one of the image processing apparatuses P21 to P2*m*.

In the description below, the MFP P21 in the telework network TN is operated by user operation. However, the same process is applied to the case that any one of other grouped image processing apparatuses P21 to P2*m* is operated.

First, the user information (user ID and password) is input on the MFP P21 in the telework network TN by user operation to request for the user authentication. Since the telework network TN does not include the authentication function and the cloud portal server PS2 includes the authentication function, the MFP P21 requests the cloud portal server PS2 to authenticate the user.

Figure 16:
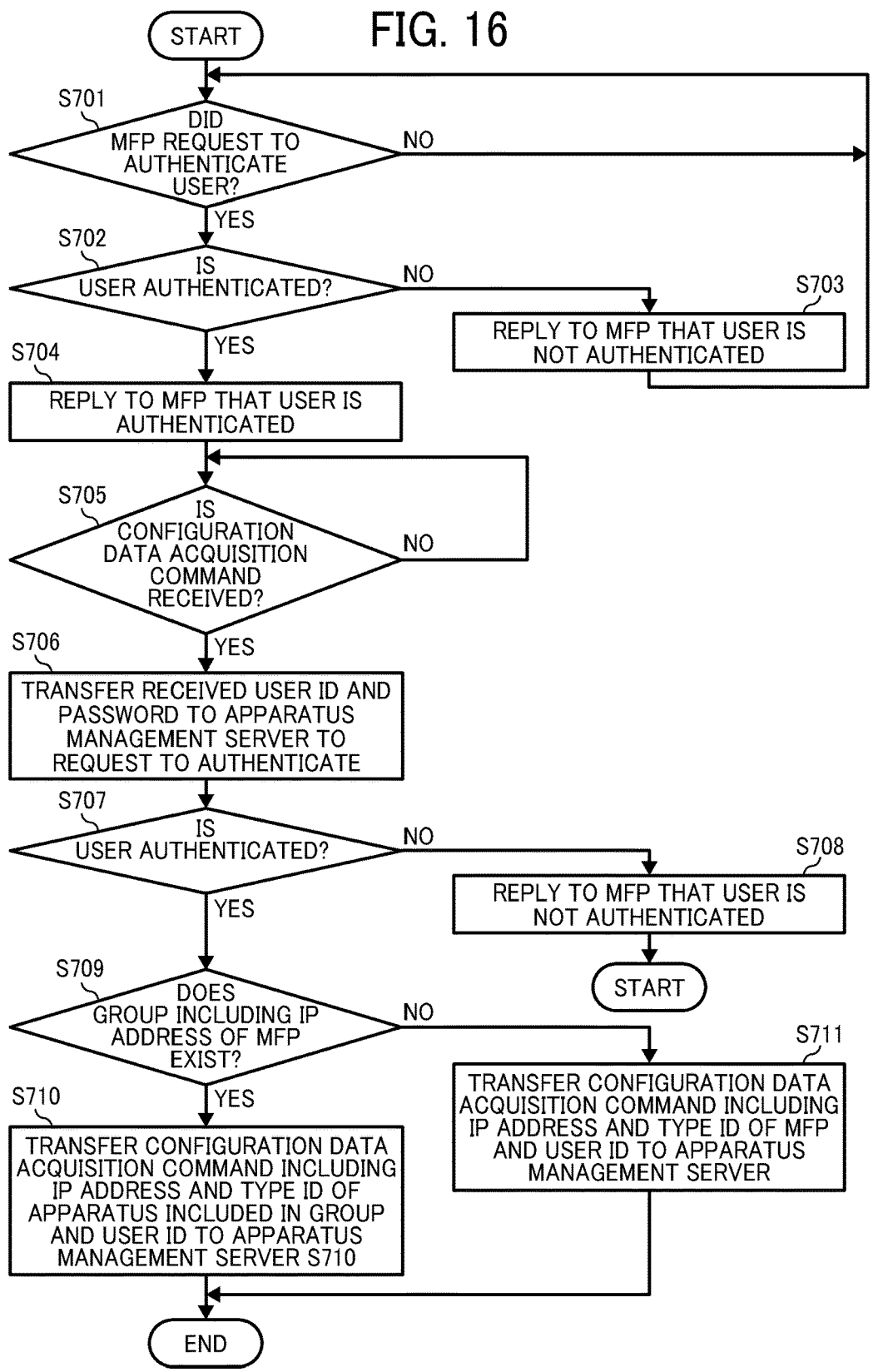
FIG. 16 is a flowchart illustrating an intermediate process performed by the cloud portal server in the second embodiment of the present invention.

Next, as shown in FIG. 16, the cloud portal server PS2 performs the apparatus management process. That is, as shown in FIG. 16, the cloud portal server PS2 checks whether or not the MFP P21 requests to authenticate the user in S701. That is, after the data receiver 101 receives the data, it is checked whether or not the received data corresponds to the user ID, password, and the authentication request.

If the data receiver 101 receives the authentication request (YES in S701), in the cloud portal server PS2, the user authentication processor 102 checks whether or not the authentication is OK in S702. That is, the user authentication processor 102 determines whether or not the authentication is OK based on the fact whether or not the user ID and password received by the data receiver 101 is registered in the user information storage unit 106.

If the authentication result is not OK (NO in S702), the user authentication processor 102 replies to the MFP P21 that requests for the authentication that the authentication is not OK in S703, and the process returns to S701.

If the authentication result is OK (YES in S702), the user authentication processor 102 replies to the MFP P21 that requests for the authentication that the authentication is OK in S704.

Next, in the cloud portal server PS2, the data receiver 101 waits for receiving the configuration information acquisition command in S705.

The MFP P21 transfers the configuration information acquisition command including its own IP address, type ID, and the user ID to the cloud portal server PS2.

If the data receiver 101 receives the configuration information acquisition command (YES in S705), the user authentication cooperation unit 107 transfers the received user ID and password to the device management server SV to request for the authentication in S705.

After receiving the user information and the authentication request from the cloud portal server PS2, the user authentication processor 74 in the device management server SV searches through the user data storage unit 76 based on the user ID and password to authenticate the user. After succeeding in the user authentication, the device management server SV replies to the cloud portal server PS2 that the authentication is OK. In case of failing in the user authentication, the device management server SV replies to the cloud portal server PS2 that the authentication is not OK.

After requesting the authentication, in the cloud portal server PS2, the user authentication cooperation unit 107 checks whether or not the authentication result that the data receiver 101 receives from the device management server SV is OK in S707.

In S707, if the authentication result is not OK (NO in S707), the user authentication cooperation unit 107 requests the data transmitter 104 to notify the MFP P21 that the user authentication failed in S708, and the process ends.

In S707, if the authentication result is OK (YES in S707), the user authentication cooperation unit 107 requests the group apparatus data search unit 121 to search through the group apparatus data storage unit 122 to check whether or not there is a group that includes the IP address of the MFP P21 in S709.

In S709, if there is the group that includes the IP address of the MFP P21 (YES in S709), the user authentication cooperation unit 107 requests the data transmitter 104 to transfer the configuration information acquisition command including IP address and type ID of the image processing apparatuses P21 to P2*m* included in the group and the user ID to the device management server SV in S710, and the process ends.

In S709, if there is not the group that includes the IP address of the MFP P21 (NO in S709), the user authentication cooperation unit 107 requests the data transmitter 104 to transfer the configuration information acquisition command including IP address and type ID of the MFP P21 and the user ID to the device management server SV in S711, and the process ends.

The cloud portal server PS2 stores IP address and type ID of the MFP P21 and user ID and password in the temporary folder temporarily. After finishing the process, the cloud portal server PS discards these data.

After receiving the configuration information acquisition command, the device management server SV searches for the configuration information and the device ID of the mobile device KT allowed to connect stored in the device data storage unit 73 based on the user ID and type ID for each of the device types and reads them.

The device management server SV transfers the configuration information and the device ID of the mobile device KT allowed to connect stored in association with the user ID and the type ID of the MFP to IP address of the MFP P21.

The MFP P21 stores these data in the temporary folder.

If the type ID of the videoconference terminal is included in the configuration information acquisition command received from the cloud portal server PS2, the device management server SV transfers the configuration information stored in association with the type ID and the user ID and the device ID of the mobile device KT allowed to connect to IP address of the videoconference terminal P22.

The videoconference terminal P22 stores these data in the temporary folder.

Furthermore, if the type ID of the electronic whiteboard is included in the configuration information acquisition command received from the cloud portal server PS2, the device management server SV transfers the configuration information stored in association with the type ID and the user ID and the device ID of the mobile device KT allowed to connect to IP address of the electronic whiteboard P2m.

The electronic whiteboard P2m stores these data in the temporary folder.

After that, the document is scanned etc. using the mobile device KT and the MFP P21 by user operation, and the operation process is similar to the case described above.

In addition, a videoconference session is held between the videoconference terminal P22 and the videoconference terminal P31 in the sub-network SN by user operation. The videoconference terminals P22 and P31 can store conference materials in the nonvolatile memory (e.g., flash ROM etc.), and the videoconference terminal P22 stores the conference material received from the videoconference terminal P31 in the nonvolatile memory (e.g., flash ROM etc.). After finishing the videoconference session, the mobile device KT is connected to the videoconference terminal P22 via the wireless LAN by user operation specifying the IP address of the videoconference terminal P22 to transfer the conference materials received from the videoconference terminal P31 to the mobile device KT. The mobile device KT transfers its own device ID to the videoconference terminal P22.

The videoconference terminal P22 checks whether or not the device ID received from the mobile device KT is the same as the device ID received from the device management server SV preliminarily. If those device IDs are the same, the videoconference terminal P22 transfers a conference material list notice including data stored in the flash ROM such as conference material names to the mobile device KT.

After receiving the notice, the mobile device KT displays the conference material names on the display. After the conference material name to be acquired is selected by user operation, the mobile device KT transfers a conference material acquisition notice to the videoconference terminal P22.

After receiving the conference material acquisition notice, the videoconference terminal P22 reads a conference material file specified in the conference material acquisition notice from the flash ROM and transfers it to the mobile device KT.

After receiving the conference material file, the mobile device KT stores it in the internal memory (e.g., flash ROM).

In addition, the electronic whiteboard P2m is connected to the electronic whiteboard P1n in the managed network KN via the Internet IN to exchange displayed files and handwritten data with each other and store them in the internal nonvolatile memory (e.g., flash ROM). The electronic whiteboards P2m and P1n include a microphone and a speaker, and it is possible to a voice communication session between the telework network TN and the managed network KN.

In addition, it is possible to connect the electronic whiteboard P2m to the electronic whiteboard P1n in the managed network KN and hold a conference session displaying a same material on both sides and modifying the material in handwriting. After finishing the conference session, the mobile device KT is connected to the electronic whiteboard P2m via the wireless LAN by user operation specifying the IP address of the electronic whiteboard P2m to transfer the handwritten data on the electronic whiteboard P2m to the mobile device KT. The mobile device KT transfers its own device ID to the electronic whiteboard P2m.

The electronic whiteboard P2m checks whether or not the device ID received from the mobile device KT is the same as the device ID of the mobile device KT allowed to connect received from the device management server SV preliminarily. If those device IDs are the same, the electronic whiteboard P2m transfers a conference material list notice including the conference material names stored in the flash ROM to the mobile device KT. It should be noted that the electronic whiteboard P2m also digitizes the handwritten data and transfers its file name included in the conference material list notice.

After receiving the conference material list notice, the mobile device KT displays the conference material names and handwritten filenames on the display. After selecting the conference material name and handwritten filename to be acquired among the conference material names and handwritten filenames displayed on the mobile device KT by user operation, the mobile device KT transfers a conference material acquisition notice to the electronic whiteboard P2m.

After receiving the conference material acquisition notice, the electronic whiteboard P2m transfers the conference material file and handwritten file specified in the conference material acquisition notice to the mobile device KT.

After receiving those files, the mobile device KT stores them in the internal memory (e.g., flash ROM).

Just like the case in the first embodiment, the MFP P21 in the telework network TN does not store the scanning configuration information of the scanner in the HDD etc. and does not transfer the configuration information to the device management server SV.

If the logout button on the UI unit 12 in the MFP P21 is pressed or no operation status period expires after predetermined amount of time, the MFP P21 transitions to a logout status that disables operations on the UI unit 12 and erases the data stored in the temporary folder.

Furthermore, if no operation status period expires after predetermined amount of time or the configuration information is received from the device management server SV, the videoconference terminal P22 erases the conference material data received from the videoconference terminal P31 and stored in the nonvolatile memory (flash ROM). In addition, the videoconference terminal P22 erases the configuration information stored in the nonvolatile memory (flash ROM).

If no operation status period expires after predetermined amount of time or the configuration information is received from the device management server SV, the electronic whiteboard P2m erases the conference materials and handwritten data stored in the nonvolatile memory (flash ROM). In addition, the electronic whiteboard P2m erases the configuration information stored in the nonvolatile memory (flash ROM).

In the above description, the user information (user ID and password) is input using the IC card reader etc. included in the MFP P21 to start using the MFP P21 by user operation. In this embodiment, it is possible to perform the process similar to the process described above by inputting the user information on any one of the grouped image processing apparatuses P21 to P2m, e.g., on the videoconference terminal P22.

Figure 17:
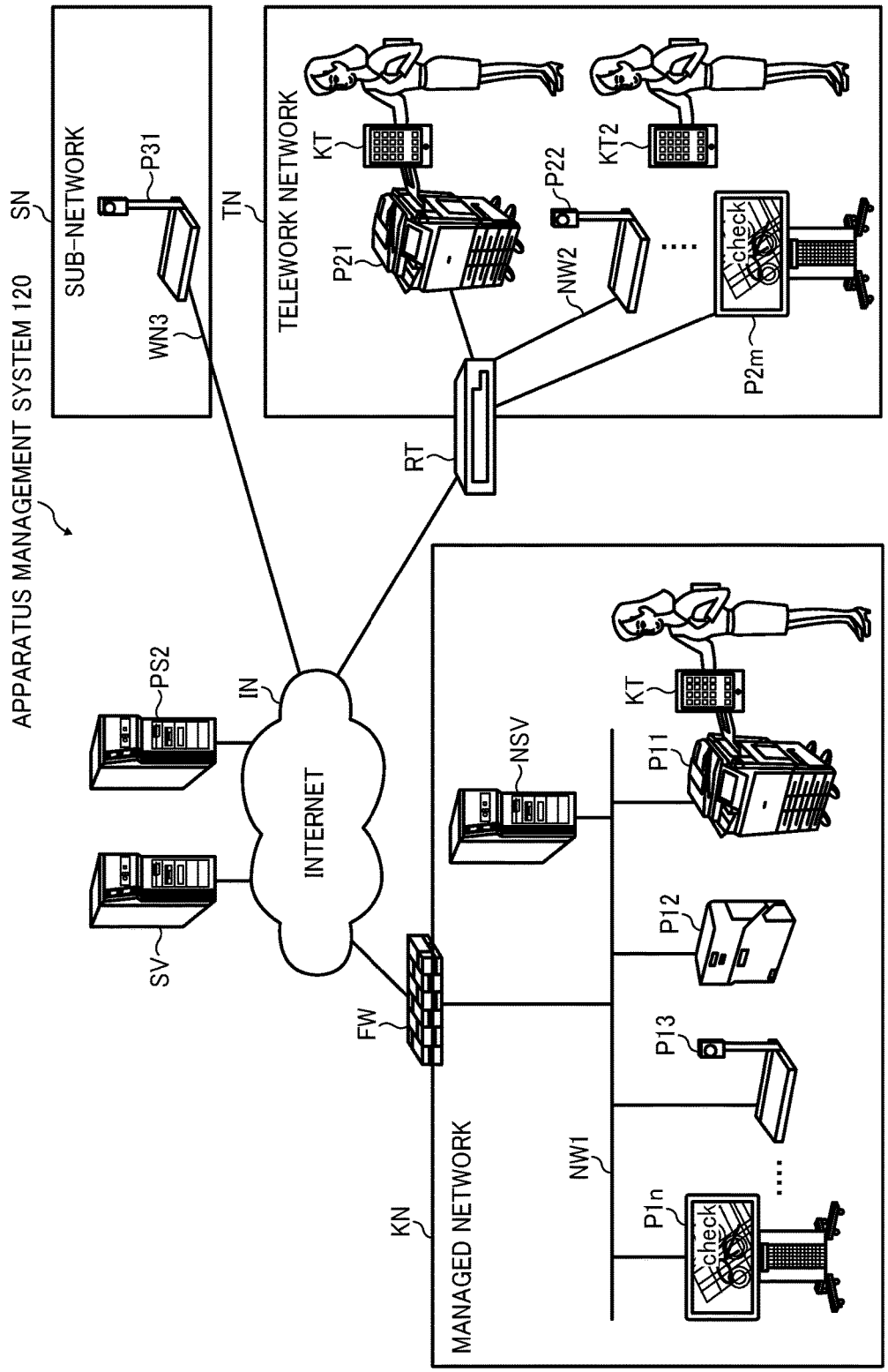
FIG. 17 is a diagram illustrating a process of preventing data theft by a third-party mobile device in the second embodiment of the present invention.

In addition, in the device management system 120, there is no limitation using the image processing apparatuses P21 to P2m in the telework network TN. As a result, for example, as shown in FIG. 17, it is possible that the mobile device KT2 different from the mobile device KT used by a user other than users of the managed network KN is connected to the image processing apparatuses P21 to P2m.

In this case, as described above, the image data of the document is stored in the temporary folder temporarily using the MFP P21 by user operation of the mobile device KT, the scanned image data is transferred to the mobile device KT, and it is stored in the mobile device KT.

Accordingly, it is possible to try to transfer the scanned image data stored in the temporary folder of the MFP P21 to the mobile device KT2 by user operation of the mobile device KT2. In this case, since the device ID transferred by the mobile device KT2 does not match the device ID received from the device management server SV and stored in the nonvolatile memory (flash ROM), the MFP P21 rejects data transfer via the mobile device KT2. As a result, it is possible to prevent the scanned image data from being transferred to the mobile device other than the mobile device KT, e.g., the mobile device KT2, preventing the data from leaking.

Similarly, if the mobile device KT2 is connected to the electronic whiteboard P2m via the wireless LAN specifying IP address of the electronic whiteboard P2m by user operation, the mobile device KT2 transfers its own device ID to the electronic whiteboard P2m In this case, since the device ID transferred by the mobile device KT2 does not match the device ID received from the device management server SV and stored in the nonvolatile memory (flash ROM), it is rejected to transfer data via the mobile device KT2.

Furthermore, in the above description, the cloud portal server PS2 registers the image processing apparatuses P21 to P2m in the telework network TN grouping them and managing the image processing apparatuses P21 to P2m that can be used with one user authentication in a group. In the device management system 120, it is possible to manage the image processing apparatuses in a group by the device management server SV.

In addition, in the device management system 120, it is possible to manage not only the image processing apparatuses P21 to P2m but also the image processing apparatuses P11 to P1n in the managed network KN.

As described above, in the device management system 120, grouped IP addresses and type IDs of the image processing apparatuses are registered in accordance with the user ID, and it is possible to use the grouped image processing apparatuses P21 to P2m in the telework network in response to a utilization request, ensuring confidentiality and enhancing usability.

As described above, in the device management system 120 in this embodiment, the cloud portal server PS2 stores type IDs (model identification information) of the multiple image processing apparatuses (second electronic device) P21 to P2m, device ID (third device identification information), and IP address (address of the second electronic device) in the group apparatus data storage unit (apparatus data storage unit) 122 in association with the user information (user identification information, i.e., user ID), the data transmitter 194 transfers IP addresses, type IDs, and user IDs of the image processing apparatuses P21 to P2m corresponding to the all grouped type IDs to the device management server SV, and the device management server SV transfers the device ID allowed to connect and the configuration information to each address.

As a result, by the authentication request to any one of the image processing apparatuses P21 to P2m, it is possible to use the other grouped image processing apparatuses P21 to P2m safely, ensuring security of secret information and enhancing usability.

In the device management system 120 in this embodiment, it is possible to use the mobile device KT and the videoconference terminal P31 as the third electronic apparatuses, implementing usability in the telework network TN just like the usability in the managed network KN.

As a result, it is possible to enhance usability of the image processing apparatuses P11 to P1n and P21 to P2m, the mobile device KT, and the videoconference terminal P31 etc. via the network, ensuring security of secret information.

The present invention also encompasses a non-transitory recording medium storing a program that executes a device management method, performed by a device management system. The device management method, performed by the device management system, includes the steps of storing authorized user identification information indicating who is allowed to use at least a first electronic device and a second electronic device, receiving user identification information of a user from the first electronic device, and determining whether the user is allowed to use at least the first electronic device using the user identification information, and when the user is allowed to use, further storing third device identification information of a third electronic device carried by the user and device type information indicating a device type of the first electronic device that are received from the first electronic device in association with the user identification information of the user in the memory.

Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits. A processing circuit includes a programmed processor. A processing circuit also includes devices such as an application specific integrated circuit (ASIC) and conventional circuit components arranged to perform the recited functions.

What is claimed is:

1. A device management system, comprising:
a device management apparatus connected to at least a first videoconference terminal disposed on a first network;
a second videoconference terminal disposed on a second network different than the first network; and
an intervening apparatus disposed between the device management apparatus and the second videoconference terminal,
wherein the device management apparatus includes a first processor configured to,
store authorized user identification information indicating at least one user who is allowed to use at least the first videoconference terminal and the second videoconference terminal in a memory of the device management apparatus,
receive user identification information of the user input into the first videoconference terminal from the first videoconference terminal,
determine whether the user is allowed to use at least the first videoconference terminal using the user identification information input into the first videoconference terminal and the authorized user identification information, and
when the user is determined to be allowed to use the first videoconference terminal, allow a mobile electronic device carried by the user to connect to the first videoconference terminal,
and after the first videoconference terminal finishes communication with at least one other videoconference terminal,
store an address of the at least one other videoconference terminal, third device identification information of the mobile electronic device, device type information indicating a device type of the first videoconference terminal, and configuration information corresponding to functions of the first videoconference terminal that the user has accessed received from the first videoconference terminal, in association with the user identification information of the user in the device management apparatus memory;
and the intervening apparatus includes a second processor configured to,
receive second user identification information input into the second videoconference terminal from the second videoconference terminal, and
determine whether the user is allowed to use at least the first videoconference terminal based on whether the second user identification information received from the second videoconference terminal matches the user identification information input into the first videoconference terminal and the authorized user identification information stored in the device management apparatus, and
when the user is determined to be allowed to use the first videoconference terminal,
transmit a request for acquiring the address of the at least one other videoconference terminal, the third device identification information of the mobile electronic device, the device type information, and the configuration information, stored in association with the authorized user identification information to the device management apparatus, and
receive the address of the at least one other videoconference terminal, the third device identification information, the device type information and the configuration information from the device management apparatus; and the second videoconference terminal includes a third processor configured to,
receive a request for communicating from the mobile electronic device carried by the user, the request including device identification information of the mobile electronic device,
when the request for communicating from the mobile electronic device includes a request to communicate with the at least one other videoconference terminal, and the second user identification information,
transmit a request to the intervening apparatus for the address of the at least one other videoconference terminal and the third device identification information associated with the second user identification information, and
receive the stored address of the at least one other videoconference terminal, third device identification information, the stored device type information, and the configuration information from the intervening apparatus, and
when an address of the at least one other videoconference terminal is input by the user,
determine whether the input address matches the stored address of the at least one other videoconference terminal received from the intervening apparatus,
accept the request for communicating with the at least one other videoconference terminal when the input address matches the stored address of the at least one other videoconference terminal,
determine whether the third device identification information from the mobile electronic device matches the stored third device identification information received from the intervening apparatus,
accept the request for communicating from the mobile electronic device when the third device identification information matches the stored third device identification information, and
execute a videoconference with the at least one other videoconference terminal using the mobile electronic device.

2. The device management system according to claim 1, wherein the third processor in the second videoconference terminal is configured to:
discard the address of the at least one other videoconference terminal if communication with the at least one other videoconference terminal finishes or communication idle time expires after a desired period of time.

3. The device management system according to claim 1, wherein the third processor in the second videoconference terminal is configured to:
discard the third device identification information used for communication allowance if communication with the mobile electronic device allowed based on the third device identification information finishes or communication idle time expires after a desired period of time.

4. The device management system according to claim 1, wherein the first processor of the device management apparatus is further configured to:
transmit the address of the at least one other videoconference terminal to the second videoconference terminal based on whether the second user identification information received from the second videoconference terminal via the intervening apparatus corresponds to the authorized user identification information stored in the device management apparatus.

5. The device management system according to claim 1, wherein the first processor of the device management apparatus is further configured to:
transmit the address of the at least one other videoconference terminal and the configuration information to the second videoconference terminal based on whether the second user identification information received from the second videoconference terminal via the intervening apparatus corresponds to the authorized user identification information stored in the device management apparatus.

6. The device management system according to claim 1, wherein the first processor of the device management apparatus is further configured to:
transmit the third device identification information of the mobile electronic device and the configuration information to the second videoconference terminal based on whether the second user identification information received from the second videoconference terminal via the intervening apparatus corresponds to the authorized user identification information stored in the device management apparatus.

7. A device management system, comprising:
a device management apparatus connected to at least a first videoconference terminal disposed on a first network;
a second videoconference terminal disposed on a second network different than the first network; and
an intervening apparatus disposed between the device management apparatus and the second videoconference terminal,
wherein the device management apparatus includes a first processor configured to,
store authorized user identification information indicating at least one user who is allowed to use at least the first videoconference terminal and the second videoconference terminal in a memory of the device management apparatus,
receive user identification information of the user input into the first videoconference terminal from the first videoconference terminal,
determine whether the user is allowed to use at least the first videoconference terminal using the user identification information input into the first videoconference terminal and the authorized user identification information, and
after the user is determined to be allowed to use the first videoconference terminal and the first videoconference terminal finishes communication with at least one other videoconference terminal,
store an address of the at least one other videoconference terminal that is received from the first videoconference terminal, in association with the user identification information of the user in the device management apparatus memory; and the intervening apparatus includes a second processor configured to,
receive second user identification information input into the second videoconference terminal from the second videoconference terminal, and
determine whether the user is allowed to use at least the first videoconference terminal based on whether the second user identification information received from the second videoconference terminal matches the user identification information input into the first videoconference terminal and the authorized user identification information stored in the device management apparatus, and
when the user is determined to be allowed to use the first videoconference terminal,
transmit a request for acquiring the address of the at least one other videoconference terminal stored in association with the authorized user identification information to the device management apparatus, and
receive the address of the at least one other videoconference terminal from the device management apparatus; and the second videoconference terminal includes a third processor configured to,
when a request to communicate with the at least one other videoconference terminal is input, the request including the second user identification information,
transmit a request for the address of the at least one other videoconference terminal associated with the second user identification information to the intervening apparatus,
receive the stored address of the at least one other videoconference terminal from the intervening apparatus,
when an address of the at least one other videoconference terminal is input by the user,
determine whether the input address matches the stored address of the at least one other videoconference terminal received from the intervening apparatus,
accept the request for communicating with the at least one other videoconference terminal when the input address matches the stored address of the at least one other videoconference terminal, and
execute a videoconference with the at least one other videoconference terminal.

8. A device management system, comprising:
a device management apparatus connected to at least a first videoconference terminal disposed on a first network;
a second videoconference terminal disposed on a second network different than the first network; and
an intervening apparatus disposed between the device management apparatus and the second videoconference terminal,
wherein the device management apparatus includes a first processor configured to,
store authorized user identification information indicating at least one user who is allowed to use at least the first videoconference terminal and the second videoconference terminal in a memory of the device management apparatus,
receive user identification information of the user input into the first videoconference terminal from the first videoconference terminal,
determine whether the user is allowed to use at least the first videoconference terminal using the user identification information input into the first videoconference terminal and the authorized user identification information, and
after the user is determined to be allowed to use the first videoconference terminal and the first videoconference terminal finishes communication with at least one other videoconference terminal,
store an address of the at least one other videoconference terminal, device type information indicating a device type of the first videoconference terminal, and configuration information corresponding to functions of the first videoconference terminal that the user has accessed received from the first videoconference terminal, in association with the user identification information of the user in the device management apparatus memory; and the intervening apparatus includes a second processor configured to, receive second user identification information input into the second videoconference terminal from the second videoconference terminal, and determine whether the user is allowed to use at least the first videoconference terminal based on whether the second user identification information received from the second videoconference terminal matches the user identification information input into the first videoconference terminal and the authorized user identification information stored in the device management apparatus, and when the user is determined to be allowed to use the first videoconference terminal, transmit a request for acquiring the address of the at least one other videoconference terminal, the device type information, and the configuration information, stored in association with the authorized user identification information to the device management apparatus, and receive the address of the at least one other videoconference terminal, the device type information and the configuration information from the device management apparatus; and the second videoconference terminal includes a third processor configured to, when a request to communicate with the at least one other videoconference terminal is input, the request including the second user identification information, transmit a request to the intervening apparatus for the address of the at least one other videoconference terminal associated with the second user identification information, and receive the stored address of the at least one other videoconference terminal, the stored device type information, and the configuration information from the intervening apparatus, when an address of the at least one other videoconference terminal is input by the user, determine whether the input address matches the stored address of the at least one other videoconference terminal received from the intervening apparatus, accept the request for communicating with the at least one other videoconference terminal when the input address matches the stored address of the at least one other videoconference terminal, and execute a videoconference with the at least one other videoconference terminal using the configuration information received from the intervening apparatus.

\* \* \* \* \*